(12) United States Patent
Yao et al.

(10) Patent No.: US 10,097,447 B2
(45) Date of Patent: Oct. 9, 2018

(54) METHOD, APPARATUS, AND SYSTEM FOR TRANSMITTING DATA

(71) Applicant: Huawei Technologies Co., Ltd., Shenzhen (CN)

(72) Inventors: Chunfeng Yao, Beijing (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/363,844

(22) Filed: Nov. 29, 2016

(65) Prior Publication Data

US 2017/0078185 A1    Mar. 16, 2017

Related U.S. Application Data

(63) Continuation of application No. PCT/CN2014/079017, filed on May 30, 2014.

(51) Int. Cl.
    *H04L 12/733*      (2013.01)
    *H04L 29/06*      (2006.01)
    *H04L 29/08*      (2006.01)

(52) U.S. Cl.
    CPC .......... *H04L 45/122* (2013.01); *H04L 29/06* (2013.01); *H04L 45/20* (2013.01); *H04L 67/327* (2013.01)

(58) Field of Classification Search
    CPC ....... H04L 12/733; H04L 29/06; H04L 29/08; H04L 45/20; H04L 45/122; H04L 67/327
    See application file for complete search history.

(56) References Cited

U.S. PATENT DOCUMENTS 5,987,011 A * 11/1999 Toh ................ H04W 40/10
                                                   370/331
8,199,677 B1    6/2012    Amis et al.
(Continued)

FOREIGN PATENT DOCUMENTS

CN      102131235 A    7/2011
CN      103051709 A    4/2013
(Continued)

OTHER PUBLICATIONS

Zhang, Lixia, et al., "Named Data Networking (NDN) Project,"; Relatório Técnico NDN-0001, Xerox Palo Alto Research Center-PARC, Oct. 2010, 26 pages.
(Continued)

*Primary Examiner* — Tri H Phan
(74) *Attorney, Agent, or Firm* — Slater Matsil, LLP

(57) ABSTRACT

A method, an apparatus, and a system for transmitting data are disclosed. In an embodiment, the includes receiving a detection interest packet, generating a detection response data packet according to a content name, and adding a mobility status of a first network node to a status record entry, sending the detection response data packet to a second network node so that the second network node adds a mobility status of the second network node to a first status record entry and sends the detection response data packet to a client. The client determines a revised value of a first expected distance according to the first status record entry and the first expected distance, generates a request interest packet, sends the request interest packet to at least one network node and receives the request interest packet sent by the second network node.

20 Claims, 15 Drawing Sheets

(56) References Cited

U.S. PATENT DOCUMENTS

| | | | |
|---|---|---|---|
| 9,603,118 B2* | 3/2017 | Liu | H04B 17/318 |
| 2004/0009749 A1* | 1/2004 | Arazi | H04W 36/08 |
| | | | 455/41.2 |
| 2007/0263628 A1* | 11/2007 | Axelsson | H04L 45/00 |
| | | | 370/392 |
| 2009/0010237 A1* | 1/2009 | Asou | H04W 48/10 |
| | | | 370/338 |
| 2010/0069035 A1* | 3/2010 | Johnson | H04W 4/02 |
| | | | 455/404.1 |
| 2012/0287783 A1 | 11/2012 | Kuhn et al. | |
| 2013/0029664 A1 | 1/2013 | Lee et al. | |
| 2013/0217332 A1* | 8/2013 | Altman | H04H 60/90 |
| | | | 455/41.2 |
| 2013/0282920 A1 | 10/2013 | Ihang et al. | |
| 2013/0337789 A1* | 12/2013 | Johnson | H04W 4/02 |
| | | | 455/414.1 |

FOREIGN PATENT DOCUMENTS

| | | |
|---|---|---|
| CN | 103491003 A | 1/2014 |
| CN | 103765832 A | 4/2014 |
| KR | 20090045761 A | 8/2009 |
| WO | 2013029569 A1 | 7/2013 |

OTHER PUBLICATIONS

Meisel, Michael, et al., "Listen First, Broadcast Later: Topology-Agnostic Forwarding Under High Dynamics,"; Annual Conference of International Technology Alliance in Network and Information Science, Sep. 2010, 8 pages.

* cited by examiner

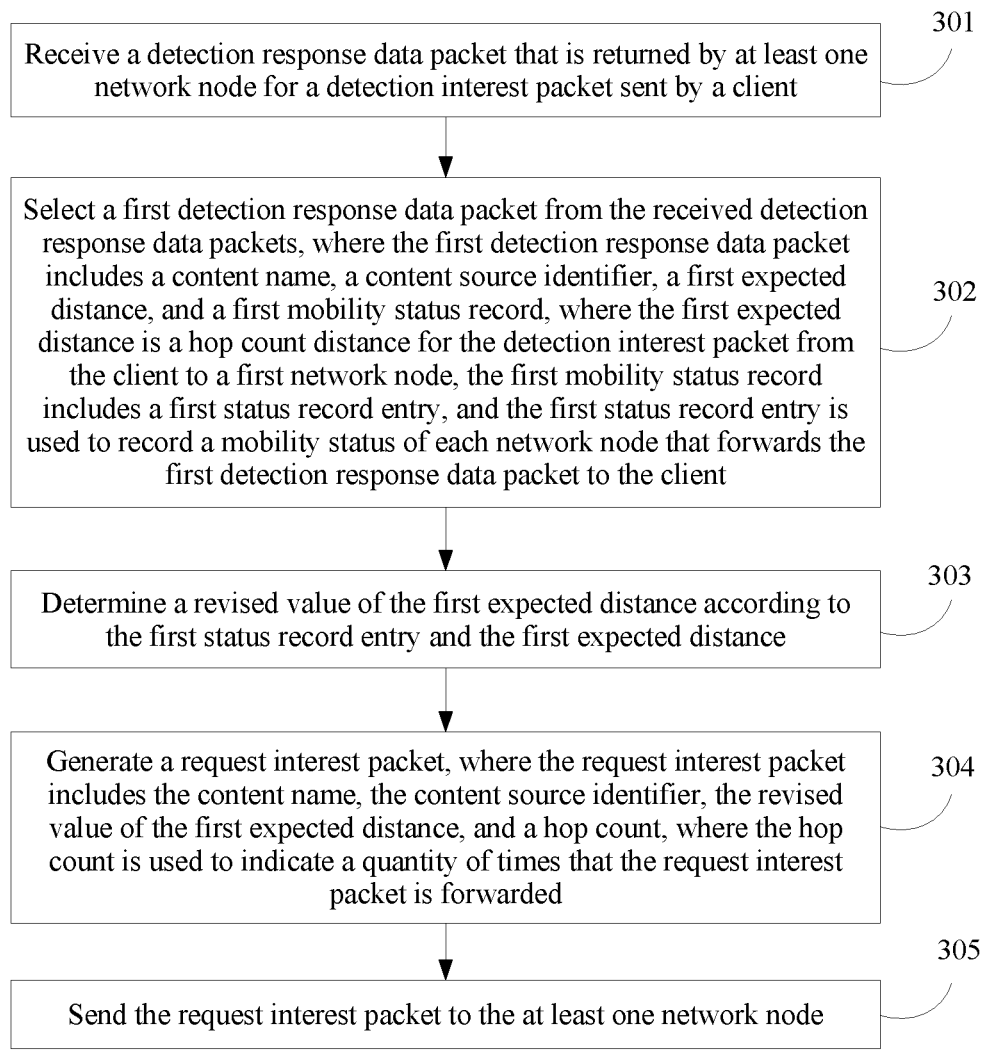

Receive a detection response data packet that is returned by at least one network node for a detection interest packet sent by a client — 301

Select a first detection response data packet from the received detection response data packets, where the first detection response data packet includes a content name, a content source identifier, a first expected distance, and a first mobility status record, where the first expected distance is a hop count distance for the detection interest packet from the client to a first network node, the first mobility status record includes a first status record entry, and the first status record entry is used to record a mobility status of each network node that forwards the first detection response data packet to the client — 302

Determine a revised value of the first expected distance according to the first status record entry and the first expected distance — 303

Generate a request interest packet, where the request interest packet includes the content name, the content source identifier, the revised value of the first expected distance, and a hop count, where the hop count is used to indicate a quantity of times that the request interest packet is forwarded — 304

Send the request interest packet to the at least one network node — 305

FIG. 3

METHOD, APPARATUS, AND SYSTEM FOR TRANSMITTING DATA

CROSS-REFERENCE TO RELATED APPLICATIONS

This application is a continuation of International Application No. PCT/CN2014/079017, filed on May 30, 2014, the disclosure of which is hereby incorporated by reference in its entirety.

TECHNICAL FIELD

The present invention relates to the communications field, and in particular, to a method, an apparatus, and a system for transmitting data.

BACKGROUND

An ICN (Information Centric Network) is a future Internet centered on content and services and providing content and services for a client. The ICN is mainly used to generate, propagate, and share content such as network news, search engines, network music, network videos, microblogs, social networking sites, or network forums. The ICN includes a client and a network node. The client and the network node may be devices such as workstations, personal computers, or servers. The network node may be a content source or a router. The client is used to request content from the network node. The content source is used to generate content. The router is used to route, forward, and cache content. When data is transmitted between routers over a wired connection, a CS (Content Store) table, a PIT (Pending Interest Table), and a FIB (Forwarding Information Base) table are set on the router. When data is transmitted between routers in a wireless manner, a CS table, a PIT, a response table, and a distance table are set on the router. The CS table is used to cache a forwarded response data packet, so that the client obtains content from the router. The PIT is used to record a forwarded detection interest packet and a forwarded request interest packet, so that a response data packet in response to the detection interest packet or a response data packet in response to the request interest packet is returned to the client. The response table is used to record an identifier of a content source capable of providing content. The distance table is used to record a distance relationship between the content source and the router. The response table and the distance table implement functions of the FIB table. The detection interest packet is used to detect a path for obtaining content by the client from the network node. The request interest packet is used by the client to request content from the network node.

In the prior art, the client may first broadcast a detection interest packet to the router, where the detection interest packet includes a content name. After the router receives the detection interest packet, the router queries whether the CS table stores a response data packet for content corresponding to the content name. If the CS table stores the response data packet for the content corresponding to the content name, the router returns a response data packet to the client according to the PIT, where the response data packet includes a content source identifier and an expected distance. If the CS table does not store the response data packet for the content corresponding to the content name, the router queries whether the response table stores a content source identifier of the content corresponding to the content name. If the response table does not store the content source identifier of the content corresponding to the content name, the router continues to broadcast the detection interest packet. If the response table stores the content source identifier of the content corresponding to the content name, the router queries a content source closest to the router in the distance table, and sends a response data packet to the client, where the response data packet includes the content source identifier and an expected distance, and at the same time, the router continues to forward the detection interest packet, until the content source sets an expected distance after receiving the detection interest packet and returns a response data packet to the client, or the detection interest packet is discarded when the detection interest packet reaches a maximum transmission hop count. After the client receives the response data packet, the client may generate a request interest packet according to the content source identifier, expected distance, and hop count and then broadcast the request interest packet to the router, and may obtain the content from the router or obtain the content from the content source through the router.

However, in the ICN, the detection interest packet, request interest packet, and response data packet may be transmitted between the client, the content source, and the router in a wireless manner, and the client, the content source, or the router may be in a moving state. When the client broadcasts the request interest packet to the router according to the response data packet to obtain the content, a network topology of the ICN may have changed, and the request interest packet possibly cannot reach the content source or the router. Therefore, a problem that a success rate of request interest packet reception by the content source or the router is low occurs.

SUMMARY

Embodiments of the present invention provide a method, an apparatus, and a system for transmitting data so that a success rate of request interest packet reception by a content source or a router is low.

According to a first aspect, a method for transmitting data is provided and is applied to a first network node, where the method includes: receiving a detection interest packet sent by a second network node, where the detection interest packet includes a content name; generating a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; adding a mobility status of the first network node to the first status record entry; sending the detection response data packet to the second network node, so that each network node that forwards the detection response data packet to the client adds the mobility status of the network node to the first status record entry and sends the detection response data packet to the client; and receiving a request interest packet sent by the second network node, where the request interest packet includes the content name, the content source identifier, and a revised value of the first expected distance, where the revised value of the first expected distance is determined by the client according to the first status record entry and the first expected distance in the detection response data packet.

With reference to the first aspect, in a first possible implementation manner, after the receiving a request interest packet sent by the second network node, the method further includes: generating a request response data packet, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; adding a mobility status of the first network node to the second status record entry; and sending the request response data packet to the second network node, so that each network node that forwards the request response data packet to the client adds the mobility status of the network node to the second status record entry and sends the request response data packet to the client.

With reference to either of the first aspect and the first possible implementation manner, in a second possible implementation manner, the mobility status includes a moving speed and a moving direction of the network node.

According to a second aspect, a method for transmitting data is provided and is applied to a second network node, where the method includes: receiving a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; adding a mobility status of the second network node to the first status record entry; forwarding the detection response data packet to the client; receiving the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet; and forwarding the request interest packet to the first network node according to the revised value of the first expected distance and the hop count.

With reference to the second aspect, in a first possible implementation manner, the forwarding the request interest packet to the first network node according to the revised value of the first expected distance and the hop count includes: if a sum of the hop count in the request interest packet and a hop count distance from the second network node to the first network node is less than or equal to the revised value of the first expected distance, forwarding the request interest packet to the first network node; or if a sum of the hop count in the request interest packet and a hop count distance from the second network node to the first network node is greater than the revised value of the first expected distance, forwarding the request interest packet to the first network node after a delay of a preset duration.

With reference to the second aspect or the first possible implementation manner, in a second possible implementation manner, after the forwarding the request interest packet to the first network node according to the revised value of the first expected distance and the hop count, the method further includes: receiving the request response data packet sent by the first network node, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; adding a mobility status of the second network node to the second status record entry; and forwarding the request response data packet to the client.

With reference to the second aspect or the first possible implementation manner, in a third possible implementation manner, after the forwarding the request interest packet to the first network node according to the revised value of the first expected distance and the hop count, the method further includes: if a request response data packet sent by the first network node is not received in a first preset time period, updating the revised value of the first expected distance to obtain an updated value, where the request interest packet includes the first preset time period; and forwarding the request interest packet to the first network node according to the updated value and the hop count, where the request interest packet includes the updated value.

With reference to the second aspect or any one of the first possible implementation manner to the third possible implementation manner, in a fourth possible implementation manner, the mobility status includes a moving speed and a moving direction of the network node.

According to a third aspect, a method for transmitting data is provided and is applied to a client, where the method includes: receiving a detection response data packet that is returned by at least one network node for a detection interest packet sent by the client; selecting a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client; determining a revised value of the first expected distance according to the first status record entry and the first expected distance; generating a request interest packet, where the request interest packet includes the content name, the content source identifier, the revised value of the first expected distance, and a hop count, where the hop count is used to indicate a quantity of times that the request interest packet is forwarded; and sending the request interest packet to the at least one network node.

With reference to the third aspect, in a first possible implementation manner, the determining a revised value of the first expected distance according to the status record entry includes: determining the revised value of the first expected distance according to the first expected distance and the mobility status of the network node that forwards the first detection response data packet, where the revised value of the first expected distance is greater than, less than, or equal to the first expected distance.

With reference to the third aspect or the first possible implementation manner, in a second possible implementation manner, the selecting a first detection response data packet from the received detection response data packets includes: parsing the received detection response data packets, and selecting the first detection response data packet according to first expected distances and first mobility status records in the detection response data packets and according to a selection rule.

With reference to the second possible implementation manner, in a third possible implementation manner, after the sending the request interest packet to the at least one network node, the method further includes receiving a request response data packet that is returned for the request data packet.

With reference to the third aspect or the second possible implementation manner, in a fourth possible implementation manner, after the sending the request interest packet to the at least one network node, the method further includes: if a request response data packet that is returned for the request data packet is not received in a first preset time period, updating the revised value of the first expected distance to obtain an updated value, where the request interest packet includes the first preset time period; and repeatedly sending the updated request interest packet to the at least one network node, where the updated request interest packet includes the updated value.

With reference to the third aspect or any one of the first possible implementation manner to the fourth possible implementation manner, in a fifth possible implementation manner, the mobility status includes a moving speed and a moving direction of the network node.

According to a fourth aspect, a first network node is provided and includes: a first receiving unit, configured to receive a detection interest packet sent by a second network node, where the detection interest packet includes a content name; a first generation unit, configured to generate a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; a first adding unit, configured to add a mobility status of the first network node to the first status record entry; a first sending unit, configured to send the detection response data packet to the second network node, so that each network node that forwards the detection response data packet to the client adds the mobility status of the network node to the first status record entry and sends the detection response data packet to the client; and a second receiving unit, configured to receive a request interest packet sent by the second network node, where the request interest packet includes the content name, the content source identifier, and a revised value of the first expected distance, where the revised value of the first expected distance is determined by the client according to the first status record entry and the first expected distance in the detection response data packet.

With reference to the fourth aspect, in a first possible implementation manner, the first network node further includes: a second generation unit, configured to generate a request response data packet, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; a second adding unit, configured to add a mobility status of the first network node to the second status record entry; and a second sending unit, configured to send the request response data packet to the second network node, so that each network node that forwards the request response data packet to the client adds the mobility status of the network node to the second status record entry and sends the request response data packet to the client.

With reference to either of the fourth aspect and the first possible implementation manner, in a second possible implementation manner, the mobility status includes a moving speed and a moving direction of the network node.

According to a fifth aspect, a second network node is provided and includes: a first receiving unit, configured to receive a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; a first adding unit, configured to add a mobility status of the second network node to the first status record entry; a first forwarding unit, configured to forward the detection response data packet to the client; a second receiving unit, configured to receive the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet; and a second forwarding unit, configured to forward the request interest packet to the first network node according to the revised value of the first expected distance and the hop count.

With reference to the fifth aspect, in a first possible implementation manner, the second forwarding unit is specifically configured to: if a sum of the hop count in the request interest packet and a hop count distance from the second network node to the first network node is less than or equal to the revised value of the first expected distance, forward the request interest packet to the first network node; or if a sum of the hop count in the request interest packet and a hop count distance from the second network node to the first network node is greater than the revised value of the first expected distance, forward the request interest packet to the first network node after a delay of a preset duration.

With reference to the fifth aspect or the first possible implementation manner, in a second possible implementation manner, the second network node further includes: a third receiving unit, configured to receive the request response data packet sent by the first network node, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; a second adding unit, configured to add a mobility status of the second network node to the second status record entry; and a third forwarding unit, configured to forward the request response data packet to the client.

With reference to the fifth aspect or the first possible implementation manner, in a third possible implementation manner, the second network node further includes: an updating unit, configured to update the revised value of the first expected distance to obtain an updated value if a request response data packet sent by the first network node is not received in a first preset time period, where the request interest packet includes the first preset time period; and the second forwarding unit is further configured to forward the request interest packet to the first network node according to the updated value and the hop count, where the request interest packet includes the updated value.

With reference to the fifth aspect or any one of the first possible implementation manner to the third possible implementation manner, in a fourth possible implementation manner, the mobility status includes a moving speed and a moving direction of the network node.

According to a sixth aspect, a client is provided and includes: a first receiving unit, configured to receive a detection response data packet that is returned by at least one network node for a detection interest packet sent by the client; a selection unit, configured to select a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client; a determining unit, configured to determine a revised value of the first expected distance according to the first status record entry and the first expected distance; a generation unit, configured to generate a request interest packet, where the request interest packet includes the content name, the content source identifier, the revised value of the first expected distance, and a hop count, where the hop count is used to indicate a quantity of times that the request interest packet is forwarded; and a sending unit, configured to send the request interest packet to the at least one network node.

With reference to the sixth aspect, in a first possible implementation manner, the determining unit is specifically configured to determine the revised value of the first expected distance according to the first expected distance and the mobility status of the network node that forwards the first detection response data packet, where the revised value of the first expected distance is greater than, less than, or equal to the first expected distance.

With reference to the sixth aspect or the first possible implementation manner, in a second possible implementation manner, the selection unit is specifically configured to parse the received detection response data packets, and select the first detection response data packet according to first expected distances and first mobility status records in the detection response data packets and according to a selection rule.

With reference to the second possible implementation manner, in a third possible implementation manner, the client further includes a second receiving unit, configured to receive a request response data packet that is returned for the request data packet.

With reference to the sixth aspect or the second possible implementation manner, in a fourth possible implementation manner, the client further includes: an updating unit, configured to update the revised value of the first expected distance to obtain an updated value if a request response data packet that is returned for the request data packet is not received in a first preset time period, where the request interest packet includes the first preset time period; and the sending unit is further configured to repeatedly send the updated request interest packet to the at least one network node, where the updated request interest packet includes the updated value.

With reference to the sixth aspect or any one of the first possible implementation manner to the fourth possible implementation manner, in a fifth possible implementation manner, the mobility status includes a moving speed and a moving direction of the network node.

According to a seventh aspect, a system for transmitting data is provided and includes at least one first network node as mentioned above, at least one second network node as mentioned above, and at least one client as mentioned above.

According to an eighth aspect, a first network node is provided and includes a receiver, configured to receive a detection interest packet sent by a second network node, where the detection interest packet includes a content name; a memory, configured to store program code; a processor, configured to invoke the program code stored in the memory to execute the following method: generating a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; where the method executed by the processor further includes: adding a mobility status of the first network node to the first status record entry; and a transmitter, configured to send the detection response data packet to the second network node, so that each network node that forwards the detection response data packet to the client adds the mobility status of the network node to the first status record entry and sends the detection response data packet to the client; where the receiver is further configured to receive the request interest packet sent by the second network node, where the request interest packet includes the content name, the content source identifier, and a revised value of the first expected distance, where the revised value of the first expected distance is determined by the client according to the first status record entry and the first expected distance in the detection response data packet.

With reference to the eighth aspect, in a first possible implementation manner, the method executed by the processor further includes: generating a request response data packet, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; and the method executed by the processor further includes adding a mobility status of the first network node to the second status record entry; and the transmitter is further configured to send the request response data packet to the second network node, so that each network node that forwards the request response data packet to the client adds the mobility status of the network node to the second status record entry and sends the request response data packet to the client.

With reference to either of the eighth aspect and the first possible implementation manner, in a second possible implementation manner, the mobility status includes a moving speed and a moving direction of the network node.

According to a ninth aspect, a second network node is provided and includes: a receiver, configured to receive a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client; a memory, configured to store program code; a processor, configured to invoke the program code stored in the memory to execute the following method: adding a mobility status of the second network node to the first status record entry; and a transmitter, configured to forward the detection response data packet to the client; where the receiver is further configured to receive the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet; and the transmitter is further configured to forward the request interest packet to the first network node according to the revised value of the first expected distance and the hop count.

With reference to the ninth aspect, in a first possible implementation manner, the transmitter is specifically configured to: if a sum of the hop count in the request interest packet and a hop count distance from the second network node to the first network node is less than or equal to the revised value of the first expected distance, forward the request interest packet to the first network node; or if a sum of the hop count in the request interest packet and a hop count distance from the second network node to the first network node is greater than the revised value of the first expected distance, forward the request interest packet to the first network node after a delay of a preset duration.

With reference to the ninth aspect or the first possible implementation manner, in a second possible implementation manner, the receiver is further configured to receive the request response data packet sent by the first network node, where the request response data packet includes a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client; and the method executed by the processor further includes adding a mobility status of the second network node to the second status record entry; and the transmitter is further configured to forward the request response data packet to the client.

With reference to the ninth aspect or the first possible implementation manner, in a third possible implementation manner, the method executed by the processor further includes: if a request response data packet sent by the first network node is not received in a first preset time period, updating the revised value of the first expected distance to obtain an updated value, where the request interest packet includes the first preset time period; and the transmitter is further configured to forward the request interest packet to the first network node according to the updated value and the hop count, where the request interest packet includes the updated value.

With reference to the ninth aspect or any one of the first possible implementation manner to the third possible implementation manner, in a fourth possible implementation manner, the mobility status includes a moving speed and a moving direction of the network node.

According to a tenth aspect, a client is provided and includes: a receiver, configured to receive a detection response data packet that is returned by at least one network node for a detection interest packet sent by the client; a memory, configured to store program code; a processor, configured to invoke the program code stored in the memory to execute the following method: selecting a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client; where the method executed by the processor further includes: determining a revised value of the first expected distance according to the first status record entry and the first expected distance; and generating a request interest packet, where the request interest packet includes the content name, the content source identifier, the revised value of the first expected distance, and a hop count, where the hop count is used to indicate a quantity of times that the request interest packet is forwarded; and a transmitter, configured to send the request interest packet to the at least one network node.

With reference to the tenth aspect, in a first possible implementation manner, the method executed by the processor includes determining the revised value of the first expected distance according to the first expected distance and the mobility status of the network node that forwards the first detection response data packet, where the revised value of the first expected distance is greater than, less than, or equal to the first expected distance.

With reference to the tenth aspect or the first possible implementation manner, in a second possible implementation manner, the method executed by the processor includes parsing the received detection response data packets, and selecting the first detection response data packet according to first expected distances and first mobility status records in the detection response data packets and according to a selection rule.

With reference to the second possible implementation manner, in a third possible implementation manner, the receiver is further configured to receive a request response data packet that is returned for the request data packet.

With reference to the tenth aspect or the second possible implementation manner, in a fourth possible implementation manner, the method executed by the processor further includes if a request response data packet that is returned for the request data packet is not received in a first preset time period, updating the revised value of the first expected distance to obtain an updated value, where the request interest packet includes the first preset time period; and the transmitter is further configured to repeatedly send the updated request interest packet to the at least one network node, where the updated request interest packet includes the updated value.

With reference to the tenth aspect or any one of the first possible implementation manner to the fourth possible implementation manner, in a fifth possible implementation manner, the mobility status includes a moving speed and a moving direction of the network node.

According to an eleventh aspect, a system for transmitting data is provided and includes at least one first network node as mentioned above, at least one second network node as mentioned above, and at least one client as mentioned above.

The embodiments of the present invention provide a method, an apparatus, and a system for transmitting data. In a detection response data packet in response to a detection interest packet, a mobility status of a network node is recorded, so that a client determines a revised value of an expected distance according to the mobility status of the network node and the expected distance that are recorded in the detection response data packet and generates a request interest packet, so that the network node receives the request interest packet. Therefore, a problem that a success rate of request interest packet reception by a content source or a router is low is effectively solved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 is a flowchart of still another method for transmitting data according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
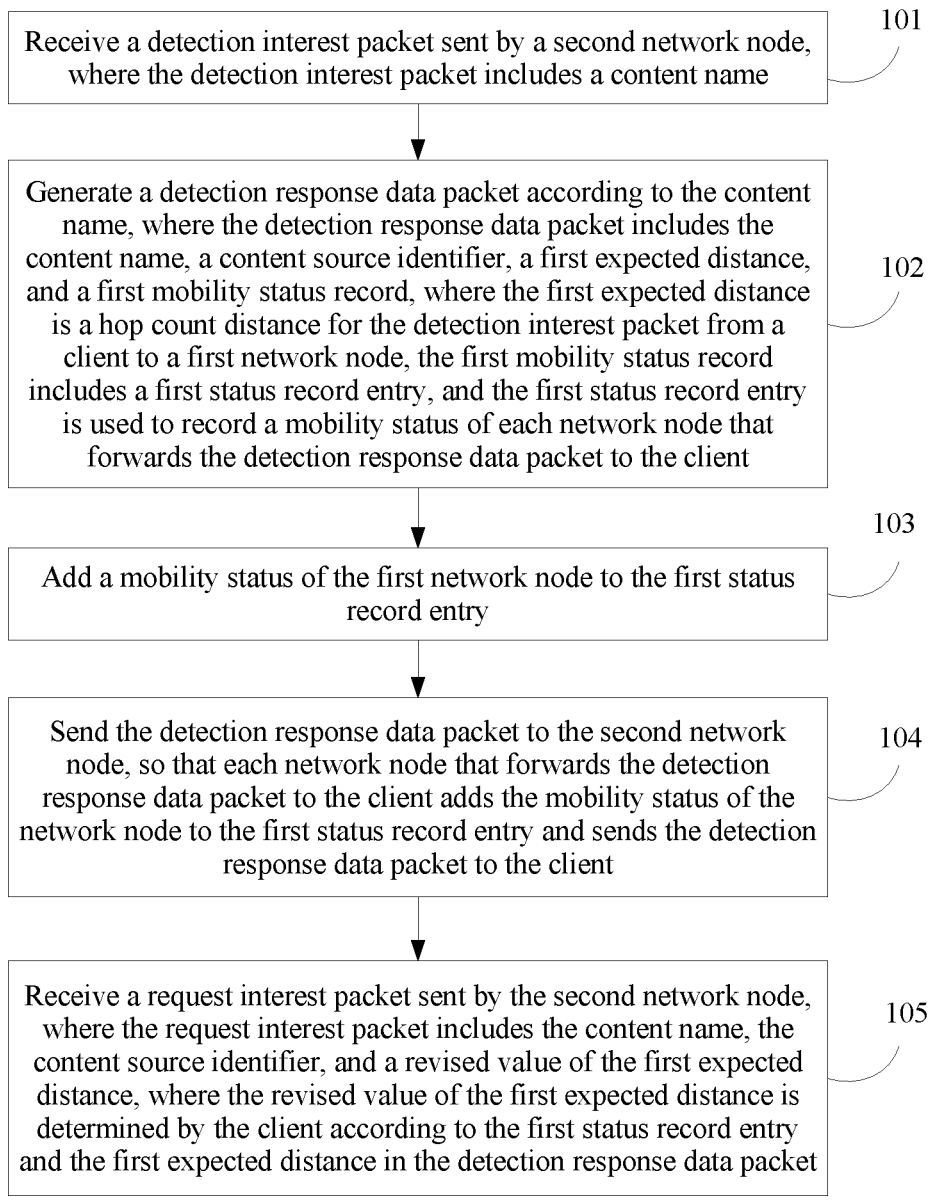
FIG. 1 is a flowchart of a method for transmitting data according to an embodiment of the present invention.

An embodiment of the present invention provides a method for transmitting data. As shown in FIG. 1, the method is applied to a first network node and includes:

Step 101: Receive a detection interest packet sent by a second network node, where the detection interest packet includes a content name.

Step 102: Generate a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

The first status record entry includes a mobility status of at least one network node, where the mobility status includes a moving speed of the network node, a moving direction of the network node, and the like.

Step 103: Add a mobility status of the first network node to the first status record entry.

Step 104: Send the detection response data packet to the second network node, so that each network node that forwards the detection response data packet to the client adds the mobility status of the network node to the first status record entry and sends the detection response data packet to the client.

Step 105: Receive a request interest packet sent by the second network node, where the request interest packet includes the content name, the content source identifier, and a revised value of the first expected distance, where the revised value of the first expected distance is determined by the client according to the first status record entry and the first expected distance in the detection response data packet.

In this way, in a detection response data packet in response to a detection interest packet, a mobility status of a network node is recorded, so that a client determines a revised value of an expected distance according to the mobility status of the network node and the expected distance that are recorded in the detection response data packet and generates a request interest packet, so that the network node receives the request interest packet. Therefore, a problem that a success rate of request interest packet reception by a content source or a router is low is effectively solved.

Figure 2:
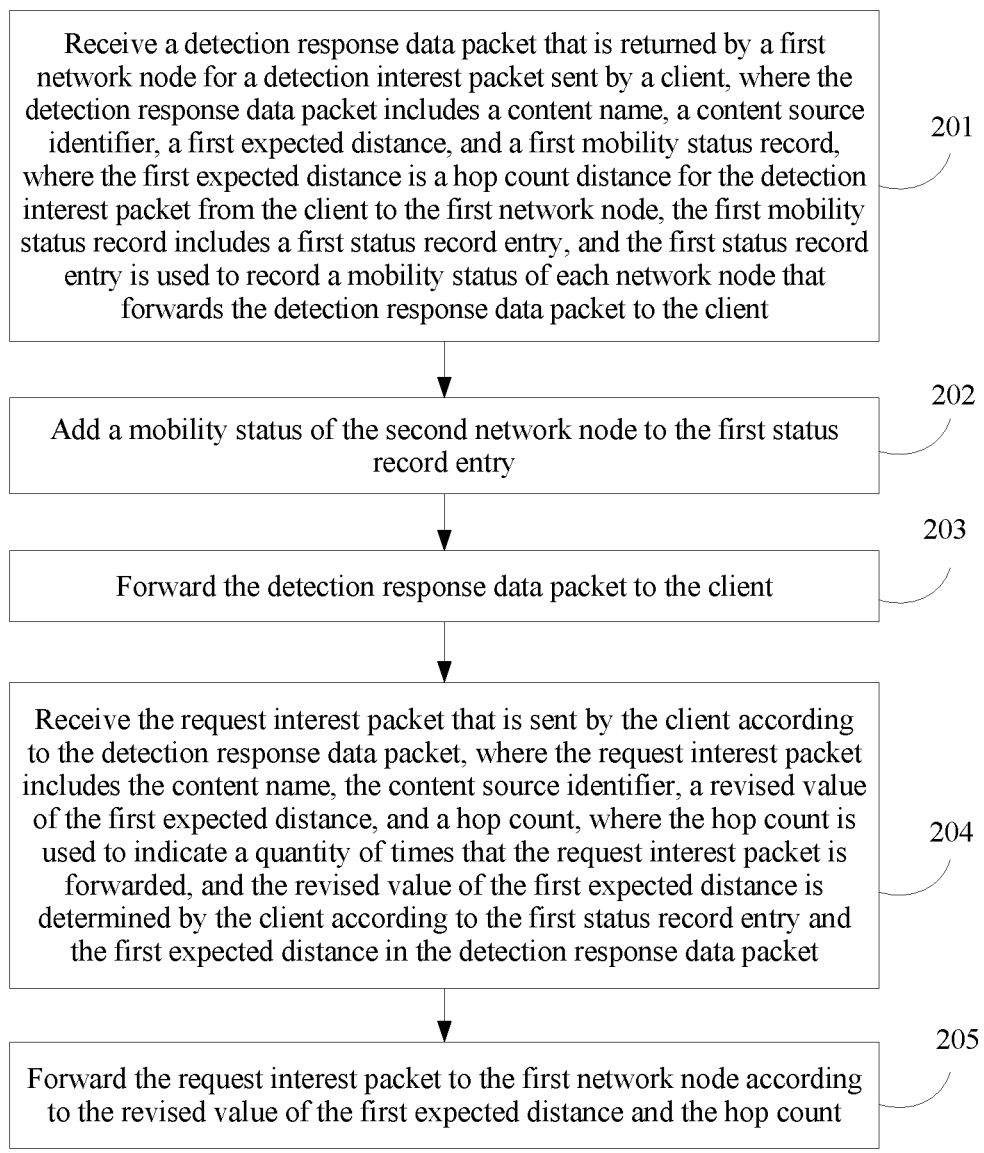
FIG. 2 is a flowchart of another method for transmitting data according to an embodiment of the present invention.

An embodiment of the present invention provides a method for transmitting data. As shown in FIG. 2, the method is applied to a second network node and includes:

Step 201: Receive a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

Step 202: Add a mobility status of the second network node to the first status record entry.

Step 203: Forward the detection response data packet to the client.

Step 204: Receive the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet.

Step 205: Forward the request interest packet to the first network node according to the revised value of the first expected distance and the hop count.

In this way, a second network node adds a mobility status of the second network node to a status record entry in a first mobility status record, so that a client determines a revised value of an expected distance according to the mobility status of the network node and the expected distance that are recorded in a detection response data packet and generates a request interest packet, so that the network node receives the request interest packet. Therefore, a problem that a success rate of request interest packet reception by a content source or a router is low is effectively solved.

An embodiment of the present invention provides a method for transmitting data. As shown in FIG. 3, the method is applied to a client and includes:

Step 301: Receive a detection response data packet that is returned by at least one network node for a detection interest packet sent by the client.

Step 302: Select a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client.

Step 303: Determine a revised value of the first expected distance according to the first status record entry and the first expected distance.

Step 304: Generate a request interest packet, where the request interest packet includes the content name, the content source identifier, the revised value of the first expected distance, and a hop count, where the hop count is used to indicate a quantity of times that the request interest packet is forwarded.

Step 305: Send the request interest packet to the at least one network node.

In this way, a client determines a revised value of an expected distance according to a mobility status of a network node and the expected distance that are recorded in a detection response data packet and generates a request interest packet, so that the network node receives the request interest packet. Therefore, a problem that a success rate of request interest packet reception by a content source or a router is low is effectively solved.

Implementation of the methods for transmitting data according to the embodiments of the present invention is based on an ICN including a client and a network node. The network node may be a content source or a router. The client is used to request content from the network node. The content source is used to generate content. The router is used to route, forward, and cache content. Data is transmitted between routers in a wireless manner. A CS table, a PIT, a response table, and a distance table are set on the router. The CS table is used to cache a forwarded response data packet, so that the client obtains content from the router. The PIT is used to record a forwarded detection interest packet and a forwarded request interest packet, so that a response data packet in response to the detection interest packet or a response data packet in response to the request interest packet is returned to the client. The response table is used to record an identifier of a content source capable of providing content. The distance table is used to record a distance relationship between the content source identifier and the router. The detection interest packet is used to detect a path for obtaining content by the client from the network node. The request interest packet is used by the client to request content from the network node.

Figure 4A:
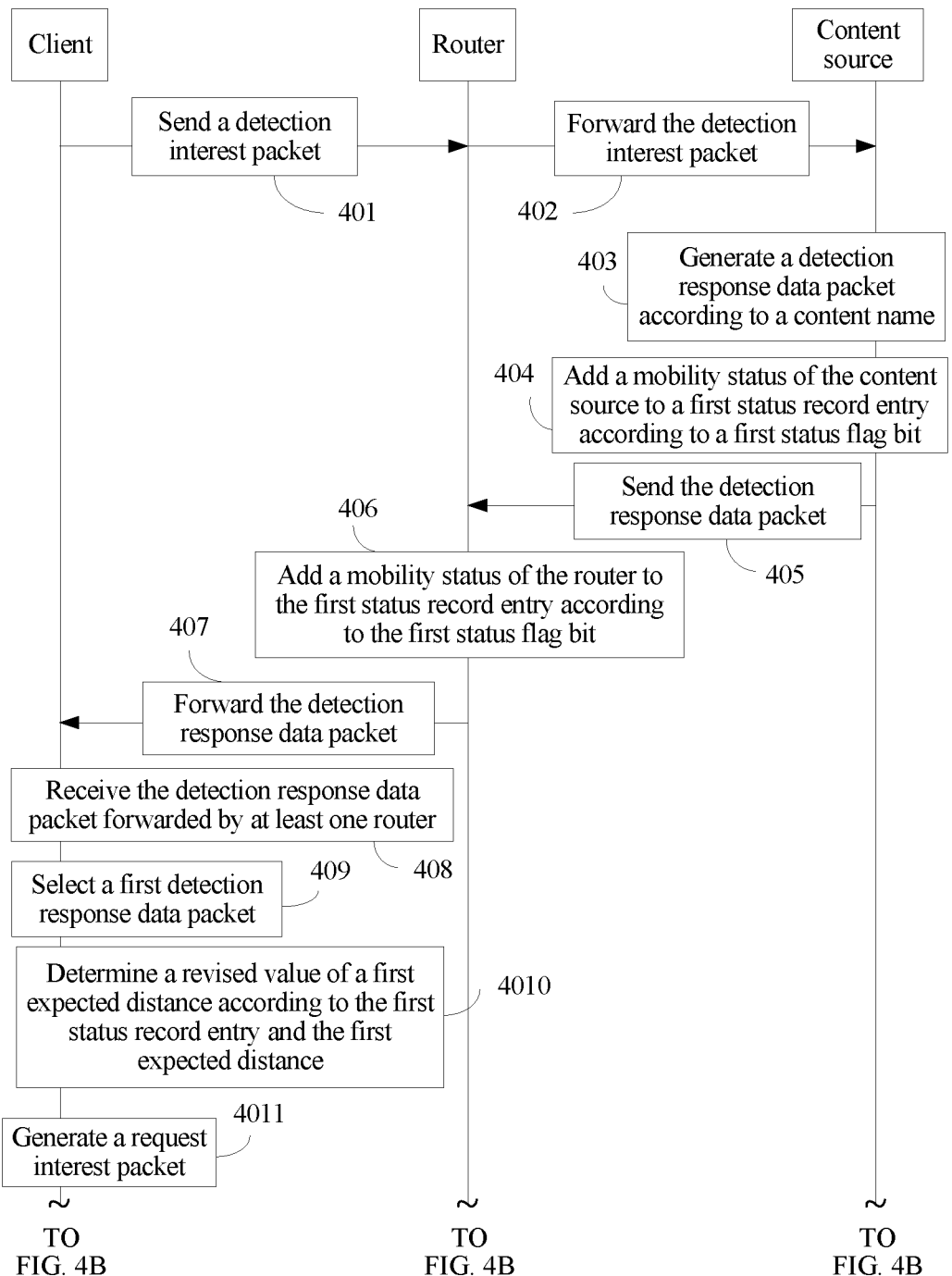
FIG. 4A and FIG. 4B are a flowchart of yet another method for transmitting data according to an embodiment of the present invention.
Figure 4B:
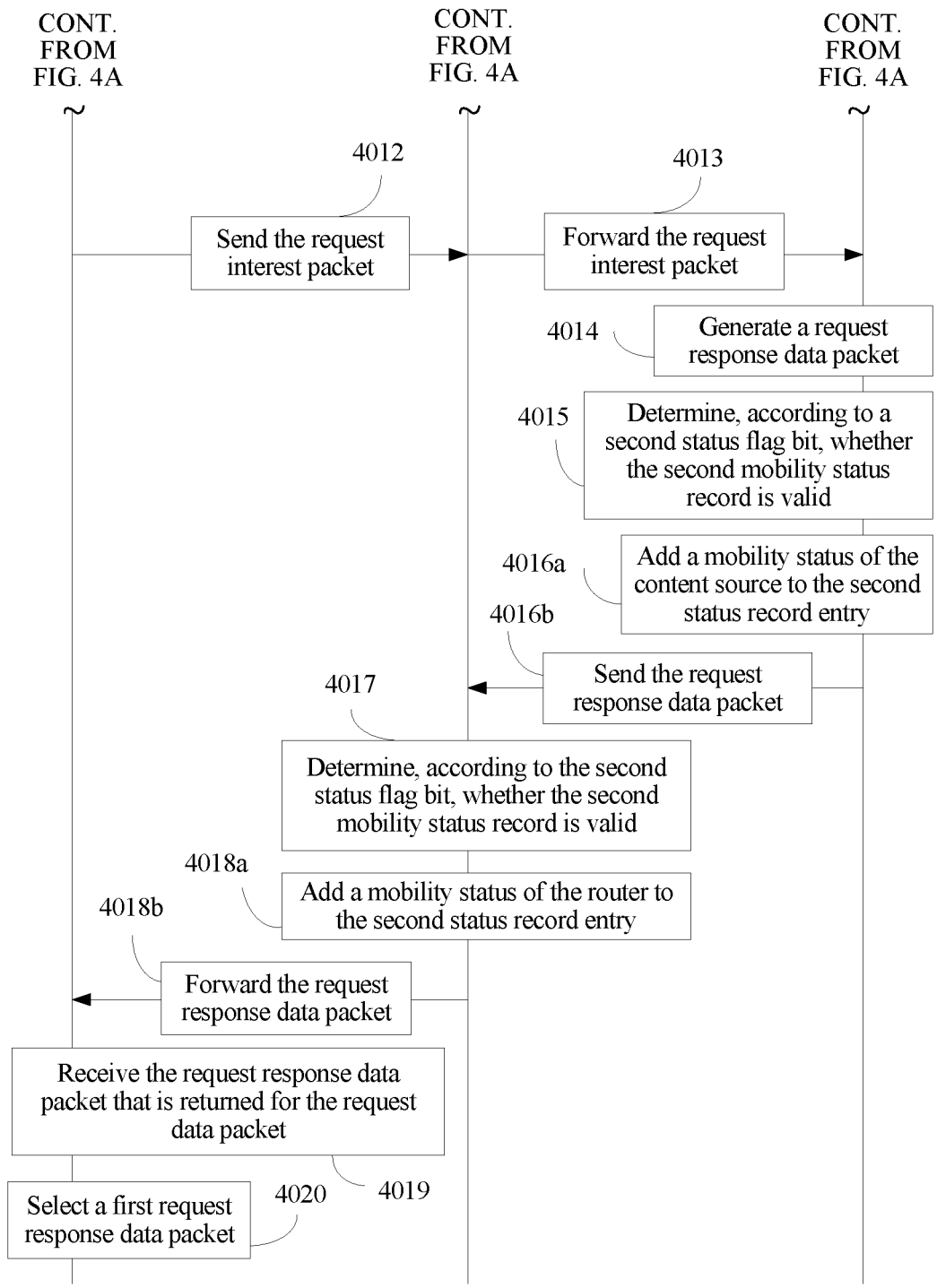

An embodiment of the present invention provides a method for transmitting data. Assuming that the method is applied to a router, a content source, and a client, as shown in FIG. 4A and FIG. 4B, the method includes:

Step 401: The client sends a detection interest packet to a router.

The client broadcasts the detection interest packet to at least one router, where the detection interest packet includes a content name. The detection interest packet further includes a hop count, and the hop count is set to 0. The hop count is used to indicate a quantity of times that the detection interest packet is forwarded. When the detection interest packet is forwarded once, 1 is added to the current hop count. Exemplarily, when the detection interest packet is sent from the client to a first router, 1 is added to the hop count; when the detection interest packet is forwarded by the first router to a second router, 1 is added to the hop count again.

Step 402: The router forwards the detection interest packet to the content source.

The router receives the detection interest packet broadcast by the client to the at least one router, and queries whether a content store table stores a response data packet for content corresponding to the content name. If the content store table does not store the response data packet for the content corresponding to the content name, the router queries whether a response table stores a content source identifier of the content corresponding to the content name. If the response table stores the content source identifier of the content corresponding to the content name, the router queries a content source closest to the router in a distance table. Then a PIT of the router records the detection interest packet. The router forwards the detection interest packet to the content source, where 1 is added to the hop count of the detection interest packet. The distance table stores a distance between the router and the closest content source, where the distance is a hop count distance from the router to the closet content source. The router may first forward the detection interest packet to other routers, and the other routers forward the detection interest packet to the content source, or the router directly forwards the detection interest packet to the content source.

It should be noted that, if the response table does not store the content source identifier of the content corresponding to the content name, the router continues to broadcast the detection interest packet, and when the detection interest packet reaches a maximum hop count, discards the detection interest packet.

Step 403: The content source generates a detection response data packet according to a content name.

The content source receives the detection interest packet sent by the router, where the detection interest packet includes the content name and the hop count. The detection response data packet is a response data packet in response to the detection interest packet, and the detection response data packet includes the content name, the content source identifier, a first expected distance, and a first mobility status record, where the first expected distance is a hop count distance for the detection interest packet from the client that sends the detection interest packet, to the content source, and is generated according to the hop count of the detection interest packet; the first mobility status record includes a first status flag bit and a first status record entry, where the first status flag bit is used to indicate validity of the first mobility status record, and the first status record entry is used to record a mobility status of each network node that forwards the detection response data packet to the client. The first status record entry includes a mobility status of at least one network node, where the mobility status includes a moving speed of the network node and a moving direction of the network node, and the network node may be the router or the content source.

Exemplarily, when the first status flag bit is 0, a first mobility status is an invalid status, that is, the first status record entry does not record the mobility status of each network node that forwards the detection response data packet to the client; when the first status flag bit is 1, the first mobility status is a valid status, that is, the first status record entry records the mobility status of each network node that forwards the detection response data packet to the client.

Particularly, the detection response data packet may further include the content corresponding to the content name.

Step 404: The content source adds a mobility status of the content source to a first status record entry according to a first status flag bit.

The content source may check that the content source identifier in the detection interest packet is null and that the expected distance is null, and therefore sets the first status flag bit to 1, that is, the first mobility status is a valid status. The content source adds the mobility status of the content source to the first status record entry.

Step 405: The content source sends the detection response data packet to the router.

Step 406: The router adds a mobility status of the router to the first status record entry according to the first status flag bit.

The router receives the detection response data packet sent by the content source, where the detection response data packet includes the content name, the content source identifier, the first expected distance, and the first mobility status record, where the first expected distance is a hop count distance for the detection interest packet from the client that sends the detection interest packet, to the content source, and the first mobility status record includes the first status flag bit and the first status record entry, where the first status flag bit is used to indicate validity of the first mobility status record, and the first status record entry is used to record the mobility status of each network node that forwards the detection response data packet to the client. The first status record entry includes a mobility status of the at least one network node, where the mobility status includes a moving speed of the network node and a moving direction of the network node, and the network node may be the router or the content source.

The router checks that the first status flag bit is 1, that is, the first mobility status is a valid status, and the router adds the mobility status of the router to the first status record entry.

Step 407: The router forwards the detection response data packet to the client according to a pending interest table.

The pending interest table PIT of the router records the detection interest packet, and the router forwards the detection response data packet to the client according to the pending interest table.

Step 408: The client receives the detection response data packet forwarded by at least one router.

The client receives the detection response data packet forwarded by the at least one router, where each detection response data packet may be forwarded by a different router, that is, a mobility status record included in each detection response data packet may record a mobility status of a router that forwards the detection response data packet.

Step 409: The client selects a first detection response data packet.

After the client receives the detection response data packet forwarded by the at least one router, first, the client parses the detection response data packet to obtain information of the first expected distance and first mobility status record; then, the client may select a detection response data packet according to at least one of the first expected distance, the first mobility status record, and a selection rule, so that the client generates a request interest packet according to the detection response data packet, where the selection rule may be a speed at which the router forwarding the detection response data packet processes the detection response data packet or a detection response data packet that is first received by the client.

For example, when the client receives two detection response data packets, the two detection response data packets are respectively a first detection response data packet and a second detection response data packet, where the first detection response data packet is a detection response data packet first received by the client, and the second detection response data packet is a detection response data packet received after the client receives the first detection response data packet, and both the first detection response data packet and the second detection response data packet are detection response data packets in response to the detection interest packet sent by the client to the content source.

If a first expected distance in the first detection response data packet records that a hop count distance for the first detection response data packet from the content source to the client is 3, and a first expected distance in the second detection response data packet records that a hop count distance for the second detection response data packet from the content source to the client is 4, the client may select a detection response data packet with a shorter hop count distance according to the first expected distances, that is, may select the first detection response data packet forwarded by fewer routers to generate a request interest packet.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, the client may check a mobility status of a network node that forwards the first detection response data packet, recorded in a first mobility status record in the first detection response data packet, and a mobility status of a network node that forwards the second detection response data packet, recorded in a first mobility status record in the second detection response data packet; if the mobility status of the network node that forwards the second detection response data packet is more stable than the mobility status of the network node that forwards the first detection response data packet, that is, a moving speed of the network node that forwards the second detection response data packet may be low, and a moving speed of the network node that forwards the first detection response data packet may be high, the client may select, according to the first mobility status records, the second detection response data packet forwarded by the router that is more stable, to generate a request interest packet, where the network node may be the router or the content source.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, and the mobility status of the network node that forwards the first detection response data packet, recorded in the first mobility status record in the first detection response data packet, is the same as the mobility status of the network node that forwards the second detection response data packet, recorded in the first mobility status record in the second detection response data packet, the client may select, according to the selection rule, the first detection response data packet forwarded by the router that processes the detection response data packet faster, to generate a request interest packet.

When the selection rule is a detection response data packet first received by the client, and when the client receives the detection response data packet, the client selects the detection response data packet to generate a request interest packet.

In an actual application, the detection response data packet may be a first detection response data packet, where the first detection response data packet may be a detection response data packet forwarded by fewest network nodes, and the network nodes are stable.

The first detection response data packet includes the content name, the content source identifier, the first expected distance, and the first mobility status record, where the first expected distance is a hop count distance for the detection interest packet from the client to the first network node, and the first mobility status record includes a first status flag bit and a first status record entry, where the first status flag bit is used to indicate validity of the first mobility status record, and the first status record entry is used to record a mobility status of each network node that forwards the first detection response data packet to the client.

Step 4010: The client determines a revised value of a first expected distance according to the first status record entry and the first expected distance.

The client obtains the first status record entry of the first mobility status record from the first detection response data packet, where the first status record entry records the mobility status of each network node that forwards the detection response data packet to the client. When the network node that forwards the first detection response data packet moves fast, the client may add 1 to the first expected distance to obtain the revised value of the first expected distance, that is, the revised value of the first expected distance is greater than the first expected distance; when the network node that forwards the first detection response data packet moves slowly or does not move, the client may not increase the first expected distance, that is, the revised value of the first expected distance is the same as the first expected distance.

Step 4011: The client generates a request interest packet.

The request interest packet includes the content name, the content source identifier, the revised value of the first expected distance, and a hop count, where the hop count is used to indicate a quantity of times that the request interest packet is forwarded, and the hop count is set to 0.

Step 4012: The client sends the request interest packet to the router.

The client sends the request interest packet to the at least one router.

Step 4013: The router forwards the request interest packet to the content source according to the revised value of the first expected distance and the hop count.

The router receives the request interest packet sent by the client, where 1 is added to the hop count. The router queries whether the content store table (CS) stores the response data packet for the content corresponding to the content name. If the content store table does not store the response data packet for the content corresponding to the content name, the router queries whether the pending interest table (PIT) records the request interest packet. If the pending interest table (PIT) does not record the request interest packet, the router queries whether the response table stores the content source identifier of the content corresponding to the content name. If the response table stores the content source identifier of the content corresponding to the content name, the router queries the content source closest to the router in the distance table, and forwards the request interest packet to the content source according to the revised value of the first expected distance and the hop count. The request interest packet includes the content name, the content source identifier, the revised value of the first expected distance, and the hop count, where the hop count is used to indicate the quantity of times that the request interest packet is forwarded. Particularly, if the pending interest table (PIT) records the request interest packet, the router discards the request interest packet.

It should be noted that, the revised value of the first expected distance is a total hop count for the request interest packet from the client to the content source, where the hop count is the quantity of times that the request interest packet is forwarded. The distance table stores a distance between the router and the content source, where the distance is a hop count distance from the router to the closest content source. When a sum of the hop count in the request interest packet and the hop count distance stored in the distance table from the router to the content source is less than or equal to the revised value of the first expected distance, the router forwards the request interest packet. When a sum of the hop count in the request interest packet and the hop count distance stored in the distance table from the router to the content source is greater than the revised value of the first expected distance, the router forwards the request interest packet after a delay of a preset duration, or discards the request interest packet. The forwarding after a delay of a preset duration means that a preset duration is added additionally before the router forwards the request interest packet, that is, the router waits for an additional period of time before forwarding the request interest packet.

Step 4014: The content source generates a request response data packet.

The content source receives the request interest packet sent by the router, and parses the request interest packet to obtain the content source identifier, the revised value of the first expected distance, and the hop count. When the content source identifier is the same as an identifier of the content source, the content source generates a request response data packet, where the request response data packet includes the content name, the content source identifier, a second expected distance, a second mobility status record, and the content corresponding to the content name, where the second expected distance is a hop count distance for the request interest packet from the client that sends the request interest packet, to the router, and is generated from the hop count in the request interest packet, and the second mobility status record includes a second status flag bit and a second status record entry, where the second status flag bit is used to indicate validity of the second mobility status record, and the second status record entry is used to record a mobility status of each network node that forwards the request response data packet to the client.

Step 4015: The content source determines, according to a second status flag bit, whether the second mobility status record is valid.

If the content source sets the second status flag bit to 1, a second mobility status is a valid status; if the content source sets the second status flag bit to 0, the second mobility status is an invalid status. It should be noted that, when the response data packet is a request response data packet for the request interest packet, the content source may set the second status flag bit to 1, that is, the second mobility status is a valid status, or set the second status flag bit to 0, that is, the second mobility status is an invalid status.

When the content source sets the second status flag bit to 1, that is, the second mobility status is a valid status, step 4016*a* is performed.

When the content source sets the second status flag bit to 0, that is, the second mobility status is an invalid status, step 4016*b* is performed.

Step 4016*a*: The content source adds a mobility status of the content source to the second status record entry. Step 4016*b* is performed.

The content source adds the mobility status of the content source to the second status record entry according to validity of the second mobility status record. It should be noted that, if the second mobility status record is invalid, the content source does not need to add the mobility status of the content source to the second status record entry.

Step 4016*b*: The content source sends the request response data packet to the router.

Step 4017: The router determines, according to the second status flag bit, whether the second mobility status record is valid.

The router receives the request response data packet sent by the content source, where the request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes the second status flag bit and the second status record entry, where the second status flag bit is used to indicate validity of the second mobility status record, and the second status record entry is used to record the mobility status of each network node that forwards the request response data packet to the client. The second status record entry includes a mobility status of the at least one network node, where the mobility status includes a moving speed of the network node and a moving direction of the network node, and the network node may be the router or the content source.

If the router checks that the second status flag bit is 1, the second mobility status is a valid status; if the router checks that the second status flag bit is 0, the second mobility status is an invalid status. It should be noted that, when the response data packet is the request response data packet for the request interest packet, the router may set the second status flag bit to 1, that is, the second mobility status is a valid status, or set the second status flag bit to 0, that is, the second mobility status is an invalid status.

When the router sets the second status flag bit to 1, that is, the second mobility status is a valid status, step 4018*a* is performed.

When the router sets the second status flag bit to 0, that is, the second mobility status is an invalid status, step 4018*b* is performed.

Step 4018*a*: The router adds a mobility status of the router to the second status record entry. Step 4018*b* is performed.

The router adds the mobility status of the router to the second status record entry according to validity of the second mobility status record. It should be noted that, if the second mobility status record is invalid, the router does not need to add the mobility status of the router to the second status record entry.

Step 4018b: The router forwards the request response data packet to the client according to the pending interest table.

The pending interest table PIT of the router records the request interest packet, and the router forwards the request response data packet to the client according to the pending interest table.

Step 4019: The client receives the request response data packet that is returned for the request data packet.

The client receives the request response data packet forwarded by the at least one router, where each request response data packet may be forwarded by a different router, that is, a mobility status record included in each request response data packet may record a mobility status of a router that forwards the request response data packet.

Step 4020: The client selects a first request response data packet.

After the client receives the request response data packet forwarded by the at least one router, first, the client parses the request response data packet to obtain information of the second expected distance and second mobility status record; then, the client may select a request response data packet according to at least one of the second expected distance, the second mobility status record, and a selection rule, so that the client generates a request interest packet according to the request response data packet, where the selection rule may be a speed at which the router forwarding the request response data packet processes the request response data packet or a request response data packet that is first received by the client.

For example, when the client receives two request response data packets, the two request response data packets are respectively a first request response data packet and a second request response data packet, where the first request response data packet is a request response data packet first received by the client, and the second request response data packet is a request response data packet received after the client receives the first request response data packet, and both the first request response data packet and the second request response data packet are request response data packets in response to the request interest packet sent by the client to the content source.

If a second expected distance in the first request response data packet records that a hop count distance for the first request response data packet from the content source to the client is 3, and a second expected distance in the second request response data packet records that a hop count distance for the second request response data packet from the content source to the client is 4, the client may select a request response data packet with a shorter hop count distance according to the second expected distances, that is, may select the first request response data packet forwarded by fewer routers to generate a request interest packet.

If the hop count distance for the first request response data packet from the content source to the client, recorded in the second expected distance in the first request response data packet, is equal to the hop count distance for the second request response data packet from the content source to the client, recorded in the second expected distance in the second request response data packet, the client may check a mobility status of a network node that forwards the first request response data packet, recorded in a second mobility status record in the first request response data packet, and a mobility status of a network node that forwards the second request response data packet, recorded in a second mobility status record in the second request response data packet; if the mobility status of the network node that forwards the second request response data packet is more stable than the mobility status of the network node that forwards the first request response data packet, that is, a moving speed of the network node that forwards the second request response data packet may be low, and a moving speed of the network node that forwards the first request response data packet may be high, the client may select, according to the second mobility status records, the second request response data packet forwarded by the router that is more stable, to generate a request interest packet, where the network node may be the router or the content source.

If the hop count distance for the first request response data packet from the content source to the client, recorded in the second expected distance in the first request response data packet, is equal to the hop count distance for the second request response data packet from the content source to the client, recorded in the second expected distance in the second request response data packet, and the mobility status of the network node that forwards the first request response data packet, recorded in the second mobility status record in the first request response data packet, is the same as the mobility status of the network node that forwards the second request response data packet, recorded in the second mobility status record in the second request response data packet, the client may select, according to the selection rule, the first request response data packet forwarded by the router that processes the request response data packet faster, to generate a request interest packet.

When the selection rule is a request response data packet first received by the client, and when the client receives the request response data packet, the client selects the request response data packet to generate a request interest packet.

In an actual application, the request response data packet may be a first request response data packet, where the first request response data packet may be forwarded by fewest network nodes, and the network nodes are stable.

The first request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes a second status flag bit and a second status record entry, where the second status flag bit is used to indicate validity of the second mobility status record, and the second status record entry is used to record a mobility status of each network node that forwards the request response data packet to the client.

Step 4020 is an optional step.

It should be noted that, in the embodiment of the present invention, the first mobility status record may be added to a packet header of the detection response data packet, and the second mobility status record may be added to a packet header of the request response data packet; in addition, a mobility status record must be added to the packet header of the detection response data packet in response to the detection interest packet, but a mobility status record may be randomly added to the packet header of the request response data packet in response to the request interest packet, and the client may instruct a network node to add a mobility status of the network node. A structure of a response data packet with a mobility status record in a packet header in the response data packet may be shown in Table 1, where the response data packet may be a detection response data packet or a request response data packet.

TABLE 1

Structure of the response data packet

Content name (Content Name)
Signature (Signature)
Identifier information (Signed Info)
(mobility status record (identifier))
Data (Data)

In an actual application, the mobility status record may be indicated by an identifier field, where the identifier field may include a mobility status of at least one network node, the mobility status may be a moving speed of the network node and/or a moving direction of the network node, and the identifier field may be set to:

<record><nodeID><speed></speed> . . . <direction></direction></node ID> . . . </record>, where, <record></record> may include the mobility status of the at least one network node, namely, at least one <node ID></node ID>, where <node ID></node ID> may include the mobility status of the network node, which may be the moving speed of the network node and/or the moving direction of the network node, where <speed></speed> may include the moving speed of the network node, and <direction></direction> may include the moving direction of the network node. The moving speed of the network node may be a specific speed of the network node, or may be a speed level of the network node, namely, high, medium, or low.

Particularly, the content source in the embodiment of the present invention may also be the router, that is, when the content store table of the router stores a response data packet for the content corresponding to the content name, the router has a same function as the content source, and provides the content for the client. In an actual application, forwarding by a router may not be required between a client and a content source, and the client may directly obtain content from the content source; or forwarding by another router may not be required between a client and a router closest to the client, and the client directly obtains content from the router closest to the client Exemplarily, when a router has forwarded a response data packet for content corresponding to a content name, a content store table of the router may store the response data packet for the content corresponding to the content name. After the router receives a detection interest packet, the router queries that the content store table stores a detection response data packet or a request response data packet for the content corresponding to the content name, generates a detection response data packet according to the content name, adds a mobility status of the router to a status record entry according to a status flag bit, and sends the detection response data packet to a second network node or a client, so that the client determines, according to the status record entry, a revised value of a first expected distance, generates a request interest packet, and sends the request interest packet to at least one network node, so that the network node receives the request interest packet.

In the method for transmitting data according to the embodiment of the present invention, first, a client sends a detection interest packet to a content source through a router; the content source generates a detection response data packet according to a content name included in the detection interest packet, adds a mobility status of the content source to a first status record entry according to a first status flag bit, and then sends the detection response data packet to the router; the router adds a mobility status of the router to the first status record entry according to the first status flag bit, and forwards the detection response data packet to the client; then, the client selects a first detection response data packet, determines a revised value of a first expected distance according to the status record entry and the first expected distance, generates a request interest packet, and sends the request interest packet to the router; the router forwards the request interest packet to the content source according to the revised value of the first expected distance and a hop count; the content source generates a request response data packet, determines, according to a second status flag bit, that the second mobility status record is valid, adds a mobility status of the content source to a second status record entry, and then sends the request response data packet to the router; the router determines, according to the second status flag bit, that the second mobility status record is valid, adds a mobility status of the router to the second status record entry, and forwards the request response data packet to the client; the client receives the request response data packet. In comparison with the prior art, a mobility status record is set in a response data packet, a mobility status of a network node is added to a status record entry in the mobility status record, and the response data packet is sent to a client, so that the client determines a revised value of an expected distance according to the status record entry, generates a request interest packet, and sends the request interest packet to at least one network node, so that the network node receives the request interest packet. Therefore, a problem of heavy network load, a long transmission delay, and a low success rate due to inadaptability of conventional routing and forwarding to moving of a network node is solved effectively, and a success rate of request interest packet reception by a content source or a router can be improved.

Figure 5:
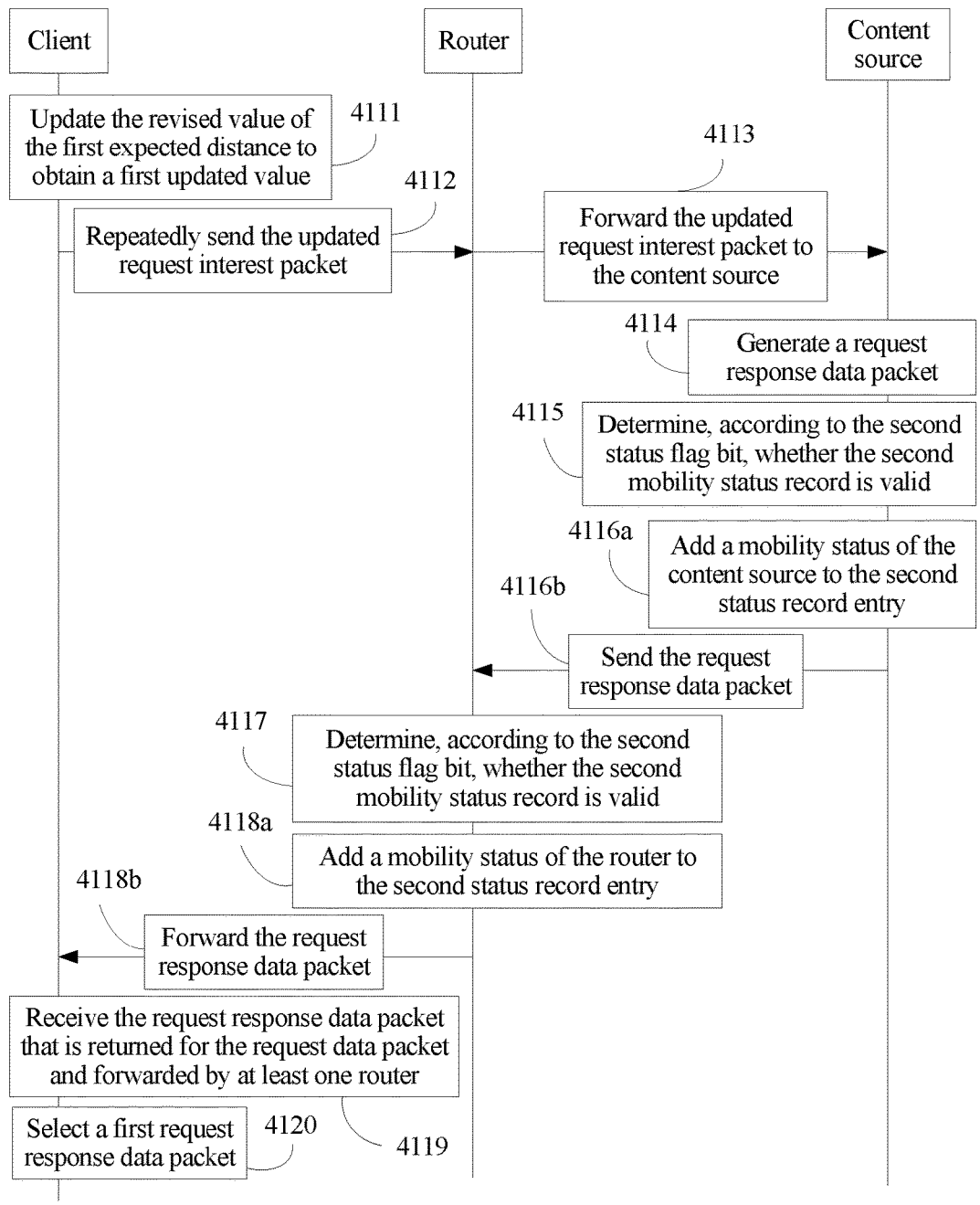
FIG. 5 is a flowchart of still yet another method for transmitting data according to an embodiment of the present invention.

An embodiment of the present invention provides a method for transmitting data, assuming that the method is applied to the router, content source, and client shown in FIG. 4A and FIG. 4B. After the client sends the request interest packet to the router, if the request response data packet returned for the request data packet is not received in a first preset time period, as shown in FIG. 5, the method includes:

Step 4111: The client updates the revised value of the first expected distance to obtain an updated value.

After the client sends the request interest packet to the at least one router, when the request response data packet sent by the at least one router is not received in the first preset time period, the client updates the revised value of the first expected distance to obtain the updated value, where the request interest packet includes the first preset time period.

Exemplarily, updating the revised value of the first expected distance to obtain the updated value may be adding 1 to the revised value of the first expected distance. Assuming that the revised value of the first expected distance is 3, 1 may be added to the revised value of the first expected distance, and the updated value obtained by updating the revised value of the first expected distance is 4.

Step 4112: The client repeatedly sends the updated request interest packet to the router.

The client repeatedly sends the updated request interest packet to the at least one router, where the updated request interest packet includes the updated value.

Step 4113: The router forwards the updated request interest packet to the content source according to the updated value and a hop count.

The router receives the updated request interest packet repeatedly sent by the client, where the updated request interest packet includes the updated value, where the updated value is the updated value of the updated revised value of the first expected distance, and forwards the updated request interest packet to the content source according to the updated value and the hop count.

Step 4114: The content source generates a request response data packet.

The content source receives the updated request interest packet repeatedly sent by the router, where the updated request interest packet includes the updated value, where the updated value is the updated value of the revised value of the first expected distance that is updated by the client. The content source parses the updated request interest packet to obtain the content source identifier and the updated value, where the content source identifier is the same as the identifier of the content source, that is, the content source is a content source for the request interest packet that is forwarded by the router according to the updated value and the hop count. The content source generates a request response data packet, where the request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes the second status flag bit and the second status record entry, where the second status flag bit is used to indicate validity of the second mobility status record, and the second status record entry is used to record a mobility status of each network node that forwards the request response data packet to the client.

Step 4115: The content source determines, according to the second status flag bit, whether the second mobility status record is valid.

If the content source sets the second status flag bit to 1, a second mobility status is a valid status; if the content source sets the second status flag bit to 0, the second mobility status is an invalid status. It should be noted that, when the response data packet is a request response data packet for the request interest packet, the content source may set the second status flag bit to 1, that is, the second mobility status is a valid status, or set the second status flag bit to 0, that is, the second mobility status is an invalid status.

When the content source sets the second status flag bit to 1, that is, the second mobility status is a valid status, step 4116a is performed.

When the content source sets the second status flag bit to 0, that is, the second mobility status is an invalid status, step 4116b is performed.

Step 4116a: The content source adds a mobility status of the content source to the second status record entry. Step 4116b is performed.

The content source adds the mobility status of the content source to the second status record entry according to validity of the second mobility status record. It should be noted that, if the second mobility status record is invalid, the content source does not need to add the mobility status of the content source to the second status record entry.

Step 4116b: The content source sends the request response data packet to the router.

Step 4117: The router determines, according to the second status flag bit, whether the second mobility status record is valid.

The router receives the request response data packet sent by the content source, where the request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes the second status flag bit and the second status record entry, where the second status flag bit is used to indicate validity of the second mobility status record, and the second status record entry is used to record the mobility status of each network node that forwards the request response data packet to the client. The second status record entry includes a mobility status of the at least one network node, where the mobility status includes a moving speed of the network node and a moving direction of the network node, and the network node may be the router or the content source.

If the router checks that the second status flag bit is 1, the second mobility status is a valid status; if the router checks that the second status flag bit is 0, the second mobility status is an invalid status. It should be noted that, when the response data packet is the request response data packet for the request interest packet, the router may set the second status flag bit to 1, that is, the second mobility status is a valid status, or set the second status flag bit to 0, that is, the second mobility status is an invalid status.

When the router sets the second status flag bit to 1, that is, the second mobility status is a valid status, step 4118a is performed.

When the router sets the second status flag bit to 0, that is, the second mobility status is an invalid status, step 4118b is performed.

Step 4118a: The router adds a mobility status of the router to the second status record entry. Step 4118b is performed.

The router adds the mobility status of the router to the second status record entry according to validity of the second mobility status record. It should be noted that, if the second mobility status record is invalid, the router does not need to add the mobility status of the router to the second status record entry.

Step 4118b: The router forwards the request response data packet to the client according to the pending interest table.

The pending interest table PIT of the router records the request interest packet, and the router forwards the request response data packet to the client according to the pending interest table.

Step 4119: The client receives the request response data packet that is returned for the request data packet.

The client receives the request response data packet forwarded by the at least one router, where each request response data packet may be forwarded by a different router, that is, a mobility status record included in each request response data packet may record a mobility status of a router that forwards the request response data packet.

Step 4120: The client selects a first request response data packet.

After the client receives the request response data packet forwarded by the at least one router, first, the client parses the request response data packet to obtain information of the second expected distance and second mobility status record; then, the client may select a request response data packet according to at least one of the second expected distance, the second mobility status record, and a selection rule, so that the client generates a request interest packet according to the request response data packet, where the selection rule may be a speed at which the router forwarding the request response data packet processes the request response data packet or a request response data packet that is first received by the client.

For example, when the client receives two request response data packets, the two request response data packets are respectively a first request response data packet and a second request response data packet, where the first request response data packet is a request response data packet first received by the client, and the second request response data packet is a request response data packet received after the client receives the first request response data packet, and both the first request response data packet and the second request response data packet are request response data packets in response to the request interest packet sent by the client to the content source.

If a second expected distance in the first request response data packet records that a hop count distance for the first request response data packet from the content source to the client is 3, and a second expected distance in the second request response data packet records that a hop count distance for the second request response data packet from the content source to the client is 4, the client may select a request response data packet with a shorter hop count distance according to the second expected distances, that is, may select the first request response data packet forwarded by fewer routers to generate a request interest packet.

If the hop count distance for the first request response data packet from the content source to the client, recorded in the second expected distance in the first request response data packet, is equal to the hop count distance for the second request response data packet from the content source to the client, recorded in the second expected distance in the second request response data packet, the client may check a mobility status of a network node that forwards the first request response data packet, recorded in a second mobility status record in the first request response data packet, and a mobility status of a network node that forwards the second request response data packet, recorded in a second mobility status record in the second request response data packet; if the mobility status of the network node that forwards the second request response data packet is more stable than the mobility status of the network node that forwards the first request response data packet, that is, a moving speed of the network node that forwards the second request response data packet may be low, and a moving speed of the network node that forwards the first request response data packet may be high, the client may select, according to the second mobility status records, the second request response data packet forwarded by the router that is more stable, to generate a request interest packet, where the network node may be the router or the content source.

If the hop count distance for the first request response data packet from the content source to the client, recorded in the second expected distance in the first request response data packet, is equal to the hop count distance for the second request response data packet from the content source to the client, recorded in the second expected distance in the second request response data packet, and the mobility status of the network node that forwards the first request response data packet, recorded in the second mobility status record in the first request response data packet, is the same as the mobility status of the network node that forwards the second request response data packet, recorded in the second mobility status record in the second request response data packet, the client may select, according to the selection rule, the first request response data packet forwarded by the router that processes the request response data packet faster, to generate a request interest packet.

When the selection rule is a request response data packet first received by the client, and when the client receives the request response data packet, the client selects the request response data packet to generate a request interest packet.

In an actual application, the request response data packet may be a first request response data packet, where the first request response data packet may be forwarded by fewest network nodes, and the network nodes are stable.

The first request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes a second status flag bit and a second status record entry, where the second status flag bit is used to indicate validity of the second mobility status record, and the second status record entry is used to record a mobility status of each network node that forwards the request response data packet to the client.

Step 4120 is an optional step.

It should be noted that, after the client obtains the content, the client may further send a detection interest packet to the content source again. When a path obtained by the client by using the detection interest packet recovers to normal, that is, an expected distance carried in a detection response data packet in response to the detection interest packet and received by the client is less than, equal to, or greater than the updated revised value of the first expected distance, a request interest packet sent by the client again to the content source or the router may carry the expected distance; the client may recover the revised value of the first expected distance used before the revised value of the first expected distance is updated, to generate a request interest packet, and send the request interest packet to the content source or the router.

In the method for transmitting data according to the embodiment of the present invention, first, a client sends a detection interest packet to a content source through a router; the content source generates a detection response data packet according to a content name included in the detection interest packet, adds a mobility status of the content source to a first status record entry according to a first status flag bit, and then sends the detection response data packet to the router; the router adds a mobility status of the router to the first status record entry according to the first status flag bit, and forwards the detection response data packet to the client; then, the client selects a first detection response data packet, determines a revised value of a first expected distance according to the status record entry and the first expected distance, generates a request interest packet, and sends the request interest packet to the router; after the client sends the request interest packet to the router, when a request response data packet sent by at least one router is not received in a first preset time period, the client updates the revised value of the first expected distance to obtain an updated value, and then repeatedly sends the updated request interest packet to the router; the router forwards the request interest packet to the content source according to the updated value and a hop count; the content source generates a request response data packet, determines, according to the second status flag bit, that the second mobility status record is valid, adds a mobility status of the content source to a second status record entry, and then sends the request response data packet to the router; the router determines, according to the second status flag bit, whether the second mobility status record is valid, and if the second mobility status record is valid, adds a mobility status of the router to the second status record entry, and forwards the request response data packet to the client. In comparison with the prior art, a client updates a revised value of an expected distance, that is, increases a hop count of the revised value of the expected distance, and then repeatedly sends an updated request interest packet to a router or a content source, so that the router or the content source receives the request interest packet. Therefore, a problem that a success rate of request interest packet reception by a content source or a router is low is effectively solved.

Figure 6:
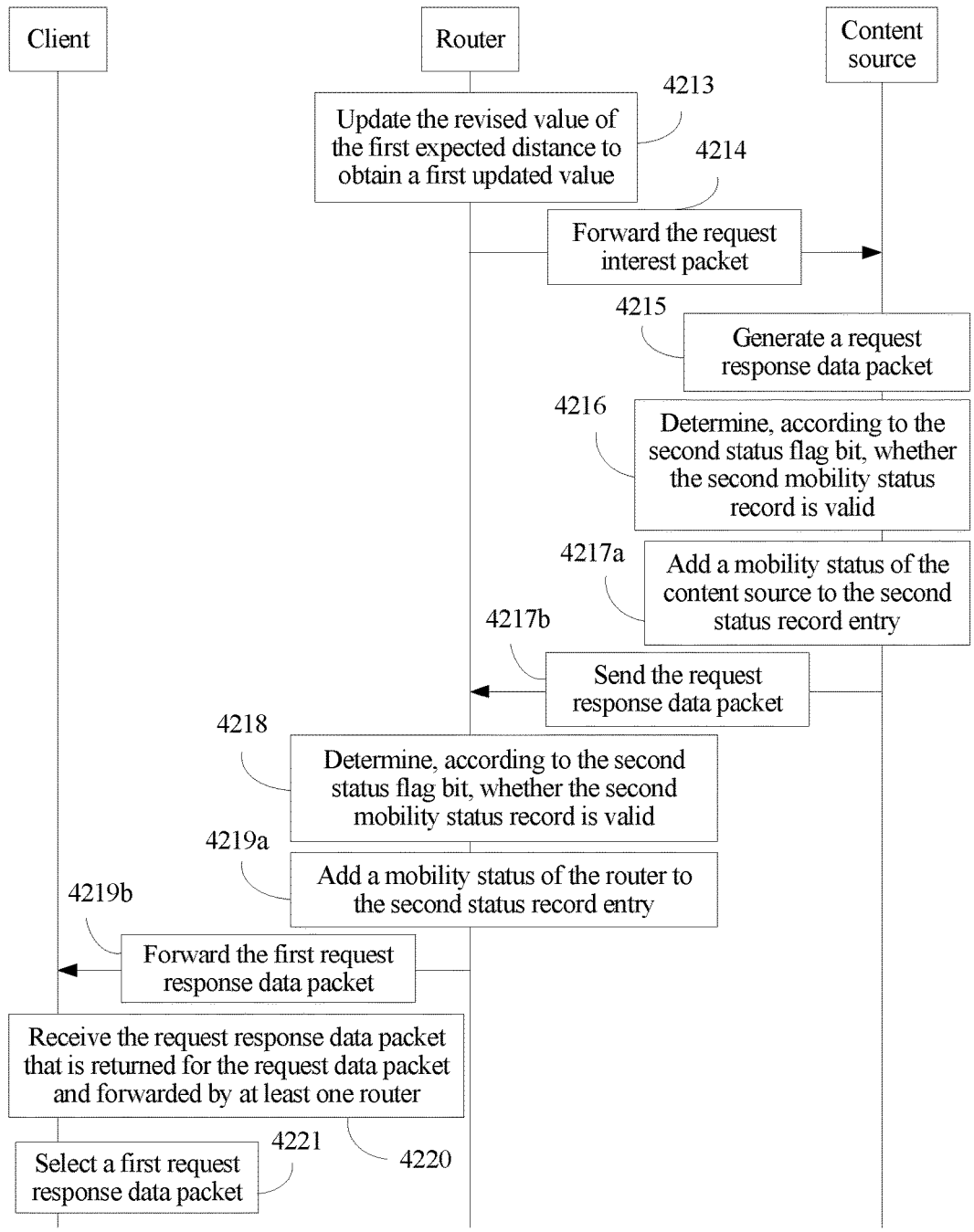
FIG. 6 is a flowchart of a further method for transmitting data according to an embodiment of the present invention.

An embodiment of the present invention provides a method for transmitting data, assuming that the method is applied to the router, content source, and client shown in FIG. 4A and FIG. 4B. After the router forwards the request interest packet to the content source according to the revised value of the first expected distance and the hop count, when the request response data packet sent by the content source is not received in a first preset time period, as shown in FIG. 6, the method includes:

Step 4213: The router updates the revised value of the first expected distance to obtain an updated value.

The router receives the request interest packet sent by the client, where the request interest packet includes the revised value of the first expected distance and the hop count. After the router forwards the request interest packet to the content source according to the revised value of the first expected distance and the hop count, when the request response data packet sent by the content source is not received in the first preset time period, the router updates the revised value of the first expected distance to obtain the updated value, where the request interest packet includes the first preset time period. It should be noted that, when other routers between the router and the content source are faulty, the router may update the revised value of the first expected distance to obtain the updated value.

Exemplarily, updating the revised value of the first expected distance to obtain the updated value may be adding 1 to the revised value of the first expected distance. Assuming that the revised value of the first expected distance is 4, 1 may be added to the revised value of the first expected distance, and the updated value obtained by updating the revised value of the first expected distance is 5.

Step 4214: The router forwards the request interest packet to the content source according to the updated value and the hop count.

The router repeatedly forwards the request interest packet to the content source according to the updated value and the hop count, where the request interest packet includes the updated value.

Step 4215: The content source generates a request response data packet.

The content source receives the request interest packet repeatedly sent by the router, where the request interest packet includes the updated value, where the updated value is the updated value of the revised value of the first expected distance that is updated by the router. The content source parses the request interest packet to obtain the content source identifier and the updated value, where the content source identifier is the same as the identifier of the content source, that is, the content source is a content source for the request interest packet that is forwarded by the router according to the updated value and the hop count. The content source generates a request response data packet, where the request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes the second status flag bit and the second status record entry, where the second status flag bit is used to indicate validity of the second mobility status record, and the second status record entry is used to record a mobility status of each network node that forwards the request response data packet to the client.

Step 4216: The content source determines, according to the second status flag bit, whether the second mobility status record is valid.

If the content source sets the second status flag bit to 1, a second mobility status is a valid status; if the content source sets the second status flag bit to 0, the second mobility status is an invalid status. It should be noted that, when the response data packet is a request response data packet for the request interest packet, the content source may set the second status flag bit to 1, that is, the second mobility status is a valid status, or set the second status flag bit to 0, that is, the second mobility status is an invalid status.

When the content source sets the second status flag bit to 1, that is, the second mobility status is a valid status, step 4217a is performed.

When the content source sets the second status flag bit to 0, that is, the second mobility status is an invalid status, step 4217b is performed.

Step 4217a: The content source adds a mobility status of the content source to the second status record entry. Step 4217b is performed.

The content source adds the mobility status of the content source to the second status record entry according to validity of the second mobility status record. It should be noted that, if the second mobility status record is invalid, the content source does not need to add the mobility status of the content source to the second status record entry.

Step 4217b: The content source sends the request response data packet to the router.

Step 4218: The router determines, according to the second status flag bit, whether the second mobility status record is valid.

The router receives the request response data packet sent by the content source, where the request response data packet includes the content name, the content source identifier, the second expected distance, the second mobility status record, and the content corresponding to the content name, where the second expected distance is a hop count distance for the request interest packet from the client that sends the request data packet, to the content source, and the second mobility status record includes the second status flag bit and the second status record entry, where the second status flag bit is used to indicate validity of the second mobility status record, and the second status record entry is used to record the mobility status of each network node that forwards the request response data packet to the client. The second status record entry includes a mobility status of the at least one network node, where the mobility status includes a moving speed of the network node and a moving direction of the network node, and the network node may be the router or the content source.

If the router checks that the second status flag bit is 1, the second mobility status is a valid status; if the router checks that the second status flag bit is 0, the second mobility status is an invalid status. It should be noted that, when the response data packet is the request response data packet for the request interest packet, the router may set the second status flag bit to 1, that is, the second mobility status is a valid status, or set the second status flag bit to 0, that is, the second mobility status is an invalid status.

When the router sets the second status flag bit to 1, that is, the second mobility status is a valid status, step 4219a is performed.

When the router sets the second status flag bit to 0, that is, the second mobility status is an invalid status, step 4219b is performed.

Step 4219a: The router adds a mobility status of the router to the second status record entry. Step 4219b is performed.

The router adds the mobility status of the router to the second status record entry according to validity of the second mobility status record. It should be noted that, if the second mobility status record is invalid, the router does not need to add the mobility status of the router to the second status record entry.

Step 4219b: The router forwards the request response data packet to the client according to the pending interest table.

The pending interest table PIT of the router records the request interest packet, and the router forwards the request response data packet to the client according to the pending interest table.

Step 4220: The client receives the request response data packet that is returned for the request data packet.

The client receives the request response data packet forwarded by the at least one router, where each request response data packet may be forwarded by a different router, that is, a mobility status record included in each request response data packet may record a mobility status of a router that forwards the request response data packet.

Step 4221: The client selects a first request response data packet.

After the client receives the request response data packet forwarded by the at least one router, first, the client parses the request response data packet to obtain information of the second expected distance and second mobility status record; then, the client may select a request response data packet according to at least one of the second expected distance, the second mobility status record, and a selection rule, so that the client generates a request interest packet according to the request response data packet, where the selection rule may be a speed at which the router forwarding the request response data packet processes the request response data packet or a request response data packet that is first received by the client.

For example, when the client receives two request response data packets, the two request response data packets are respectively a first request response data packet and a second request response data packet, where the first request response data packet is a request response data packet first received by the client, and the second request response data packet is a request response data packet received after the client receives the first request response data packet, and both the first request response data packet and the second request response data packet are request response data packets in response to the request interest packet sent by the client to the content source.

If a second expected distance in the first request response data packet records that a hop count distance for the first request response data packet from the content source to the client is 3, and a second expected distance in the second request response data packet records that a hop count distance for the second request response data packet from the content source to the client is 4, the client may select a request response data packet with a shorter hop count distance according to the second expected distances, that is, may select the first request response data packet forwarded by fewer routers to generate a request interest packet.

If the hop count distance for the first request response data packet from the content source to the client, recorded in the second expected distance in the first request response data packet, is equal to the hop count distance for the second request response data packet from the content source to the client, recorded in the second expected distance in the second request response data packet, the client may check a mobility status of a network node that forwards the first request response data packet, recorded in a second mobility status record in the first request response data packet, and a mobility status of a network node that forwards the second request response data packet, recorded in a second mobility status record in the second request response data packet; if the mobility status of the network node that forwards the second request response data packet is more stable than the mobility status of the network node that forwards the first request response data packet, that is, a moving speed of the network node that forwards the second request response data packet may be low, and a moving speed of the network node that forwards the first request response data packet may be high, the client may select, according to the second mobility status records, the second request response data packet forwarded by the router that is more stable, to generate a request interest packet, where the network node may be the router or the content source.

If the hop count distance for the first request response data packet from the content source to the client, recorded in the second expected distance in the first request response data packet, is equal to the hop count distance for the second request response data packet from the content source to the client, recorded in the second expected distance in the second request response data packet, and the mobility status of the network node that forwards the first request response data packet, recorded in the second mobility status record in the first request response data packet, is the same as the mobility status of the network node that forwards the second request response data packet, recorded in the second mobility status record in the second request response data packet, the client may select, according to the selection rule, the first request response data packet forwarded by the router that processes the request response data packet faster, to generate a request interest packet.

When the selection rule is a request response data packet first received by the client, and when the client receives the request response data packet, the client selects the request response data packet to generate a request interest packet.

In an actual application, the request response data packet may be a first request response data packet, where the first request response data packet may be forwarded by fewest network nodes, and the network nodes are stable.

The first request response data packet includes the content name, the content source identifier, the second expected distance, the second mobility status record, and the content corresponding to the content name, where the second expected distance is a hop count distance for the request interest packet from the client that sends the request interest packet, to the content source, and the second mobility status record includes a second status flag bit and a second status record entry, where the second status flag bit is used to indicate validity of the second mobility status record, and the second status record entry is used to record a mobility status of each network node that forwards the request response data packet to the client.

Step 4221 is an optional step.

In the method for transmitting data according to the embodiment of the present invention, first, a client sends a detection interest packet to a content source through a router; the content source generates a detection response data packet according to a content name included in the detection interest packet, adds a mobility status of the content source to a first status record entry according to a first status flag bit, and then sends the detection response data packet to the router; the router adds a mobility status of the router to the first status record entry according to the first status flag bit, and forwards the detection response data packet to the client; then, the client selects a first detection response data packet, determines a revised value of a first expected distance according to the first status record entry, generates a request interest packet, and sends the request interest packet to the router; after the router forwards the request interest packet to the content source according to the revised value of the first expected distance and the hop count, when a request response data packet sent by the content source is not received in a first preset time period, the router updates the revised value of the first expected distance to obtain an updated value, and forwards the request interest packet to the content source according to the updated value and the hop count; the content source generates a request response data packet, determines, according to a second status flag bit, that the second mobility status record is valid, adds a mobility status of the content source to a second status record entry, and then sends the request response data packet to the router; the router determines, according to the second status flag bit, that the second mobility status record is valid, adds a mobility status of the router to the second status record entry, and forwards the request response data packet to the client. In comparison with the prior art, a router updates a revised value of an expected distance, that is, increases a hop count of the revised value of the expected distance, and then repeatedly sends a request interest packet to a content source, so that the content source receives the request interest packet. Therefore, a problem that a success rate of request interest packet reception by a content source or a router is low is effectively solved.

Figure 7:
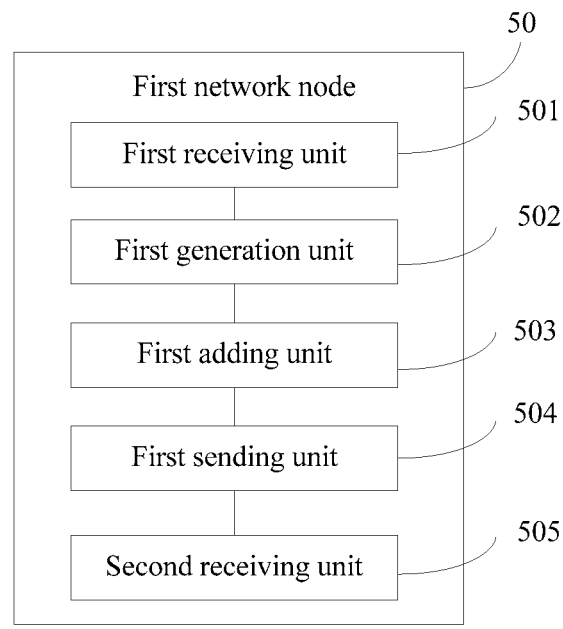
FIG. 7 is a schematic structural diagram of a first network node according to an embodiment of the present invention.

An embodiment of the present invention provides a first network node 50, as shown in FIG. 7, including a first receiving unit 501, a first generation unit 502, a first adding unit 503, a first sending unit 504, and a second receiving unit 505.

The first receiving unit 501 is configured to receive a detection interest packet sent by a second network node, where the detection interest packet includes a content name.

The detection interest packet further includes a hop count, where the hop count is set to 0, and the hop count is used to indicate a quantity of times that the detection interest packet is forwarded. When the detection interest packet is forwarded once, 1 is added to the current hop count. Exemplarily, when the detection interest packet is sent from a client to a first router, 1 is added to the hop count; when the detection interest packet is forwarded by the first router to a second router, 1 is added to the hop count again.

The first generation unit 502 is configured to generate a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

The detection response data packet may be generated according to the hop count of the detection interest packet.

Particularly, the detection response data packet may further include content corresponding to the content name.

The first adding unit 503 is configured to add a mobility status of the first network node to the first status record entry.

The first status record entry includes a mobility status of at least one network node, where the mobility status includes a moving speed of the network node and a moving direction of the network node.

The first sending unit 504 is configured to send the detection response data packet to the second network node, so that each network node that forwards the detection response data packet to the client adds the mobility status of the network node to the first status record entry and sends the detection response data packet to the client.

The second receiving unit 505 is configured to receive a request interest packet sent by the second network node, where the request interest packet includes the content name, the content source identifier, and a revised value of the first expected distance, where the revised value of the first expected distance is determined by the client according to the first status record entry and the first expected distance in the detection response data packet.

In this way, in a detection response data packet in response to a detection interest packet, a mobility status of a network node is recorded, so that a client determines a revised value of an expected distance according to the mobility status of the network node and the expected distance that are recorded in the detection response data packet and generates a request interest packet, so that the network node receives the request interest packet. Therefore, a problem that a success rate of request interest packet reception by a content source or a router is low is effectively solved.

It should be noted that, the request interest packet repeatedly sent by the second network node or the client may be further received, where the request interest packet includes an updated value, where the updated value is an updated value of the revised value of the first expected distance that is updated by the client; or the request interest packet repeatedly sent by the second network node is received, where the request interest packet includes an updated value, where the updated value is an updated value of the revised value of the first expected distance that is updated by the second network node.

Figure 8:
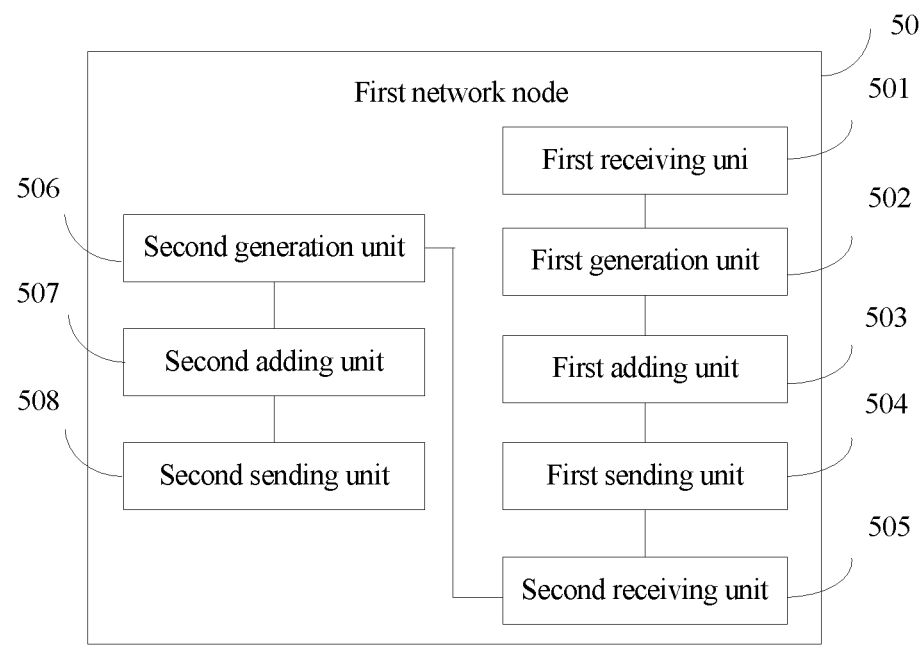
FIG. 8 is a schematic structural diagram of another first network node according to an embodiment of the present invention.

As shown in FIG. 8, the first network node 50 further includes a second generation unit 506, a second adding unit 507, and a second sending unit 508.

The second generation unit 506 is configured to generate a request response data packet, where the request response data packet includes a second expected distance, a second mobility status record, and the content corresponding to the content name, where the second expected distance is a hop count distance for the request interest packet from the client to the first network node, the second mobility status record includes a second status record entry, and the second status record entry is used to record a mobility status of each network node that forwards the request response data packet to the client.

The first network node receives the request interest packet sent by the second network node, and parses the request interest packet to obtain the content source identifier and the revised value of the first expected distance. When the content source identifier is the same as an identifier of the first network node, the first network node generates a request response data packet.

The second adding unit 507 is configured to add a mobility status of the first network node to the second status record entry.

The first network node adds the mobility status of the first network node to the second status record entry according to validity of the second mobility status record. It should be noted that, if the second mobility status record is invalid, the first network node does not need to add the mobility status of the first network node to the second status record entry.

The second sending unit 508 is configured to send the request response data packet to the second network node, so that each network node that forwards the request response data packet to the client adds the mobility status of the network node to the second status record entry and sends the request response data packet to the client.

Figure 9:
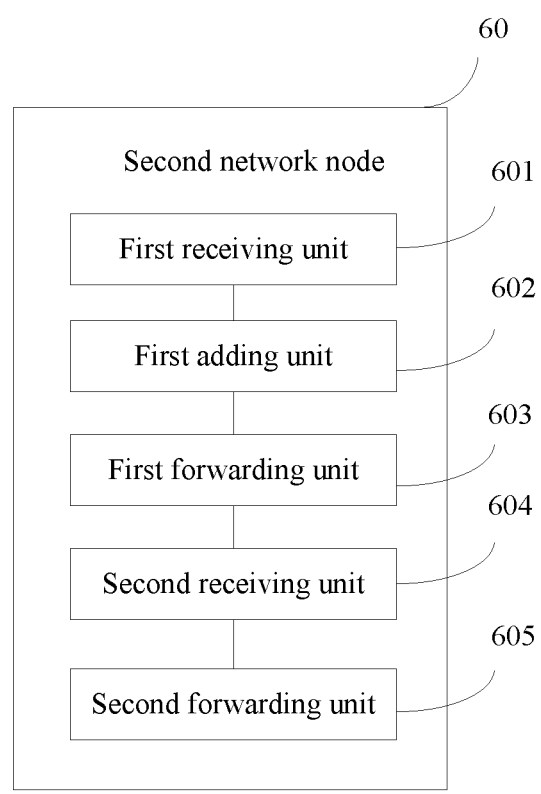
FIG. 9 is a schematic structural diagram of a second network node according to an embodiment of the present invention.

An embodiment of the present invention provides a second network node 60, as shown in FIG. 9, including a first receiving unit 601, a first adding unit 602, a first forwarding unit 603, a second receiving unit 604, and a second forwarding unit 605.

The first receiving unit 601 is configured to receive a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

The first status record entry includes a mobility status of at least one network node, where the mobility status includes a moving speed of the network node and a moving direction of the network node.

It should be noted that, before receiving the detection response data packet that is returned by the first network node for the detection interest packet sent by the client, the second network node receives the detection interest packet broadcast by the client to at least one first network node, and queries whether a content store table stores a response data packet for content corresponding to the content name; if the content store table does not store the response data packet for the content corresponding to the content name, the second network node queries whether a response table stores the content source identifier of the content corresponding to the content name; if the response table stores the content source identifier of the content corresponding to the content name, the second network node queries the first network node closest to the second network node in a distance table; then a PIT of the second network node records the detection interest packet; the second network node forwards the detection interest packet to the first network node, where 1 is added to the hop count of the detection interest packet. The distance table stores a distance between the second network node and the closest first network node, where the distance is a hop count distance from the second network node to the closet first network node. The second network node may first forward the detection interest packet to other second network nodes, and the other second network nodes forward the detection interest packet to the first network node, or the second network node directly forwards the detection interest packet to the first network node.

It should be noted that, if the response table does not store the content source identifier of the content corresponding to the content name, the second network node continues to broadcast the detection interest packet, and when the detection interest packet reaches a maximum hop count, discards the detection interest packet.

The first adding unit 602 is configured to add a mobility status of the second network node to the first status record entry.

The first forwarding unit 603 is configured to forward the detection response data packet to the client.

The second receiving unit 604 is configured to receive the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet.

It should be noted that, the request interest packet repeatedly sent by the client may be further received, where the request interest packet includes an updated value, where the updated value is an updated value of the updated revised value of the first expected distance, and the request interest packet is forwarded to the first network node according to the updated value and the hop count.

The second forwarding unit 605 is configured to forward the request interest packet to the first network node according to the revised value of the first expected distance and the hop count.

The second network node receives the request interest packet sent by the client, where 1 is added to the hop count. The second network node queries whether the content store table (CS) stores the response data packet for the content corresponding to the content name. If the content store table does not store the response data packet for the content corresponding to the content name, the second network node queries whether the pending interest table (PIT) records the request interest packet. If the pending interest table (PIT) does not record the request interest packet, the second network node queries whether the response table stores a first network node identifier of the content corresponding to the content name. If the response table stores the first network node identifier of the content corresponding to the content name, the second network node queries the first network node closest to the second network node in the distance table, and forwards the request interest packet to the first network node according to the revised value of the first expected distance and the hop count. Particularly, if the pending interest table (PIT) records the request interest packet, the second network node discards the request interest packet.

The second forwarding unit 605 is specifically configured to:

if a sum of the hop count in the request interest packet and a hop count distance from the second network node to the first network node is less than or equal to the revised value of the first expected distance, forward the request interest packet to the first network node; or if a sum of the hop count in the request interest packet and a hop count distance from the second network node to the first network node is greater than the revised value of the first expected distance, forward the request interest packet to the first network node after a delay of a preset duration; where the forwarding after a delay of a preset duration means that a preset duration is added additionally before the router forwards the request interest packet, that is, the router waits for an additional period of time before forwarding the request interest packet.

It should be noted that, the revised value of the first expected distance is a total hop count for the request interest packet from the client to the first network node, where the hop count is the quantity of times that the request interest packet is forwarded. The distance table stores a distance between the second network node and the first network node, where the distance is a hop count distance from the second network node to the first network node. When a sum of the hop count in the request interest packet and the hop count distance stored in the distance table from the second network node to the first network node is less than or equal to the revised value of the first expected distance, the second network node forwards the request interest packet. When a sum of the hop count in the request interest packet and the hop count distance stored in the distance table from the second network node to the first network node is greater than the revised value of the first expected distance, the second network node forwards the request interest packet after a delay, or discards the request interest packet.

In this way, a second network node adds a mobility status of the second network node to a status record entry in a first mobility status record, so that a client determines a revised value of an expected distance according to the mobility status of the network node and the expected distance that are recorded in a detection response data packet and generates a request interest packet, so that the network node receives the request interest packet. Therefore, a problem that a success rate of request interest packet reception by a content source or a router is low is effectively solved.

Figure 10:
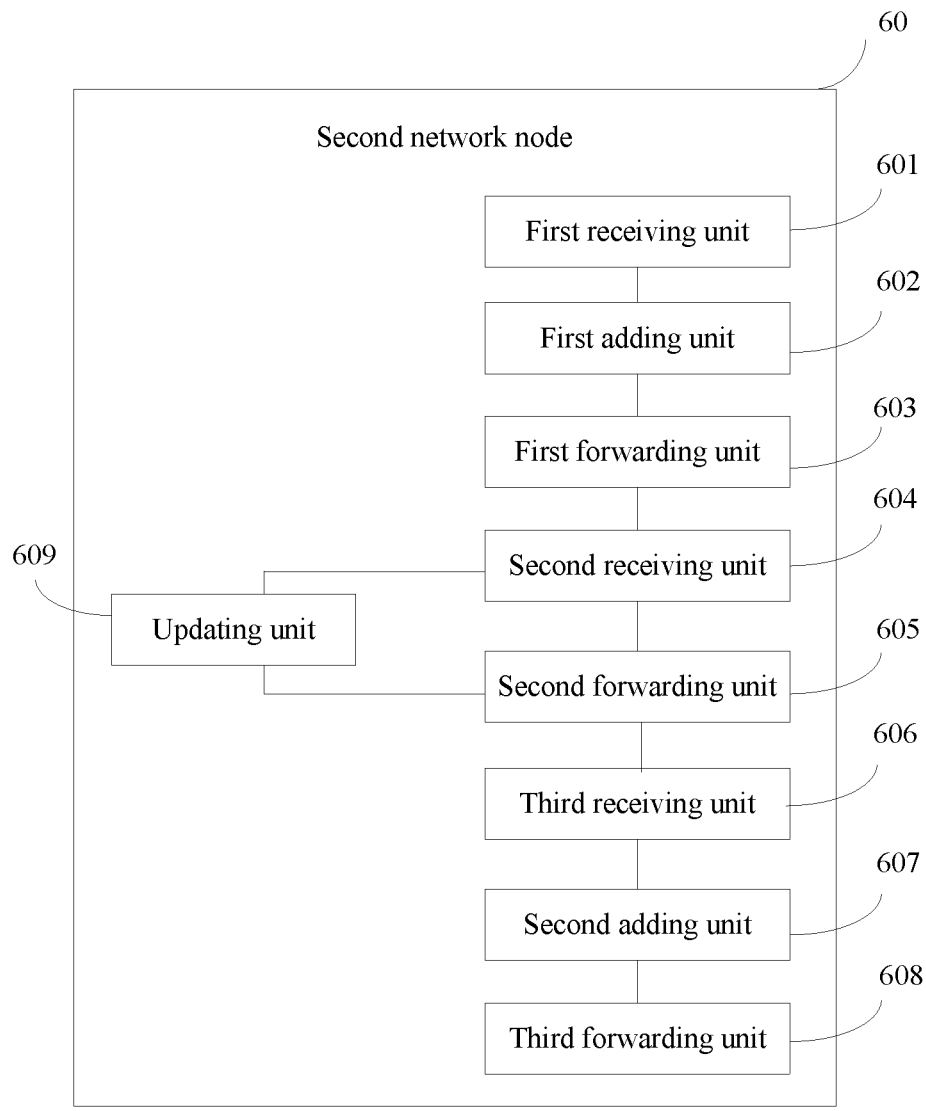
FIG. 10 is a schematic structural diagram of another second network node according to an embodiment of the present invention.

As shown in FIG. 10, the second network node 60 further includes a third receiving unit 606, a second adding unit 607, and a third forwarding unit 608.

The third receiving unit 606 is configured to receive the request response data packet sent by the first network node, where the request response data packet includes a second expected distance, a second mobility status record, and the content corresponding to the content name, where the second expected distance is a hop count distance for the request interest packet from the client to the first network node, the second mobility status record includes a second status record entry, and the second status record entry is used to record a mobility status of each network node that forwards the request response data packet to the client.

The second status record entry includes a mobility status of the at least one network node, where the mobility status includes a moving speed of the network node and a moving direction of the network node, and the network node may be the second network node or the first network node.

The second adding unit 607 is configured to add a mobility status of the second network node to the second status record entry.

The third forwarding unit 608 is configured to forward the request response data packet to the client.

The second network node 60 further includes:

an updating unit 609, configured to update the revised value of the first expected distance to obtain an updated value if the request response data packet sent by the first network node is not received in a first preset time period, where the request interest packet includes the first preset time period.

The second network node receives the request interest packet sent by the client, where the request interest packet includes the revised value of the first expected distance and the hop count. After the second network node forwards the request interest packet to the first network node according to the revised value of the first expected distance and the hop count, when the request response data packet sent by the first network node is not received in the first preset time period, the second network node updates the revised value of the first expected distance to obtain the updated value, where the request interest packet includes the first preset time period. It should be noted that, when other network nodes between the second network node and the first network node are faulty, the second network node may update the revised value of the first expected distance to obtain the updated value.

Exemplarily, updating the revised value of the first expected distance to obtain the updated value may be adding 1 to the revised value of the first expected distance. Assuming that the revised value of the first expected distance is 4, 1 may be added to the revised value of the first expected distance, and the updated value obtained by updating the revised value of the first expected distance is 5.

The second forwarding unit 605 is further configured to:

forward the request interest packet to the first network node according to the updated value and the hop count, where the request interest packet includes the updated value.

Figure 11:
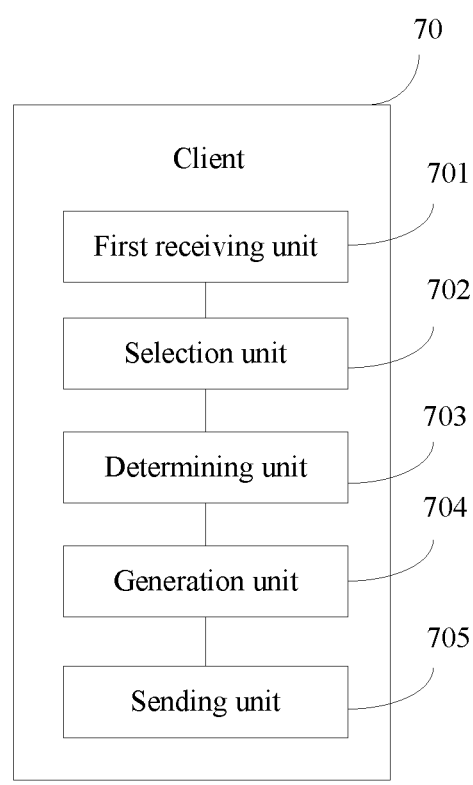
FIG. 11 is a schematic structural diagram of a client according to an embodiment of the present invention.

An embodiment of the present invention provides a client 70, as shown in FIG. 11, including a first receiving unit 701, a selection unit 702, a determining unit 703, a generation unit 704, and a sending unit 705.

The first receiving unit 701 is configured to receive a detection response data packet that is returned by at least one network node for a detection interest packet sent by the client.

Before receiving the detection response data packet that is returned by the at least one network node for the detection interest packet sent by the client, the client sends the detection interest packet to the at least one network node, where the detection interest packet includes a content name.

The selection unit 702 is configured to select a first detection response data packet from the received detection response data packets, where the first detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client.

The selection unit 702 is specifically configured to parse the received detection response data packets, and select the first detection response data packet according to first expected distances and first mobility status records in the detection response data packets and according to a selection rule.

For example, after the client receives the detection response data packet forwarded by at least one router, first, the client parses the detection response data packet to obtain information of the first expected distance and first mobility status record; then, the client may select a detection response data packet according to at least one of the first expected distance, the first mobility status record, and a selection rule, so that the client generates a request interest packet according to the detection response data packet, where the selection rule may be a speed at which the router forwarding the detection response data packet processes the detection response data packet or a detection response data packet that is first received by the client.

For example, when the client receives two detection response data packets, the two detection response data packets are respectively a first detection response data packet and a second detection response data packet, where the first detection response data packet is a detection response data packet first received by the client, and the second detection response data packet is a detection response data packet received after the client receives the first detection response data packet, and both the first detection response data packet and the second detection response data packet are detection response data packets in response to the detection interest packet sent by the client to a content source.

If a first expected distance in the first detection response data packet records that a hop count distance for the first detection response data packet from the content source to the client is 3, and a first expected distance in the second detection response data packet records that a hop count distance for the second detection response data packet from the content source to the client is 4, the client may select a detection response data packet with a shorter hop count distance according to the first expected distances, that is, may select the first detection response data packet forwarded by fewer routers to generate a request interest packet.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, the client may check a mobility status of a network node that forwards the first detection response data packet, recorded in a first mobility status record in the first detection response data packet, and a mobility status of a network node that forwards the second detection response data packet, recorded in a first mobility status record in the second detection response data packet; if the mobility status of the network node that forwards the second detection response data packet is more stable than the mobility status of the network node that forwards the first detection response data packet, that is, a moving speed of the network node that forwards the second detection response data packet may be low, and a moving speed of the network node that forwards the first detection response data packet may be high, the client may select, according to the first mobility status records, the second detection response data packet forwarded by the router that is more stable, to generate a request interest packet, where the network node may be the router or the content source.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, and the mobility status of the network node that forwards the first detection response data packet, recorded in the first mobility status record in the first detection response data packet, is the same as the mobility status of the network node that forwards the second detection response data packet, recorded in the first mobility status record in the second detection response data packet, the client may select, according to the selection rule, the first detection response data packet forwarded by the router that processes the detection response data packet faster, to generate a request interest packet.

When the selection rule is a detection response data packet first received by the client, and when the client receives the detection response data packet, the client selects the detection response data packet to generate a request interest packet.

In an actual application, the detection response data packet may be a first detection response data packet, where the first detection response data packet may be a detection response data packet forwarded by fewest network nodes, and the network nodes are stable.

The determining unit 703 is configured to determine a revised value of the first expected distance according to the first status record entry and the first expected distance.

The first status record entry includes a mobility status of the at least one network node, where the mobility status includes a moving speed of the network node and a moving direction of the network node.

The generation unit 704 is configured to generate a request interest packet, where the request interest packet includes the content name, the content source identifier, the revised value of the first expected distance, and a hop count, where the hop count is used to indicate a quantity of times that the request interest packet is forwarded.

The sending unit 705 is configured to send the request interest packet to the at least one network node.

In this way, a client determines a revised value of an expected distance according to a mobility status of a network node and the expected distance that are recorded in a detection response data packet and generates a request interest packet, so that the network node receives the request interest packet. Therefore, a problem that a success rate of request interest packet reception by a content source or a router is low is effectively solved.

The determining unit 703 is specifically configured to:

determine the revised value of the first expected distance according to the first expected distance and the mobility status of the network node that forwards the first detection response data packet, where the revised value of the first expected distance is greater than, less than, or equal to the first expected distance.

Figure 12:
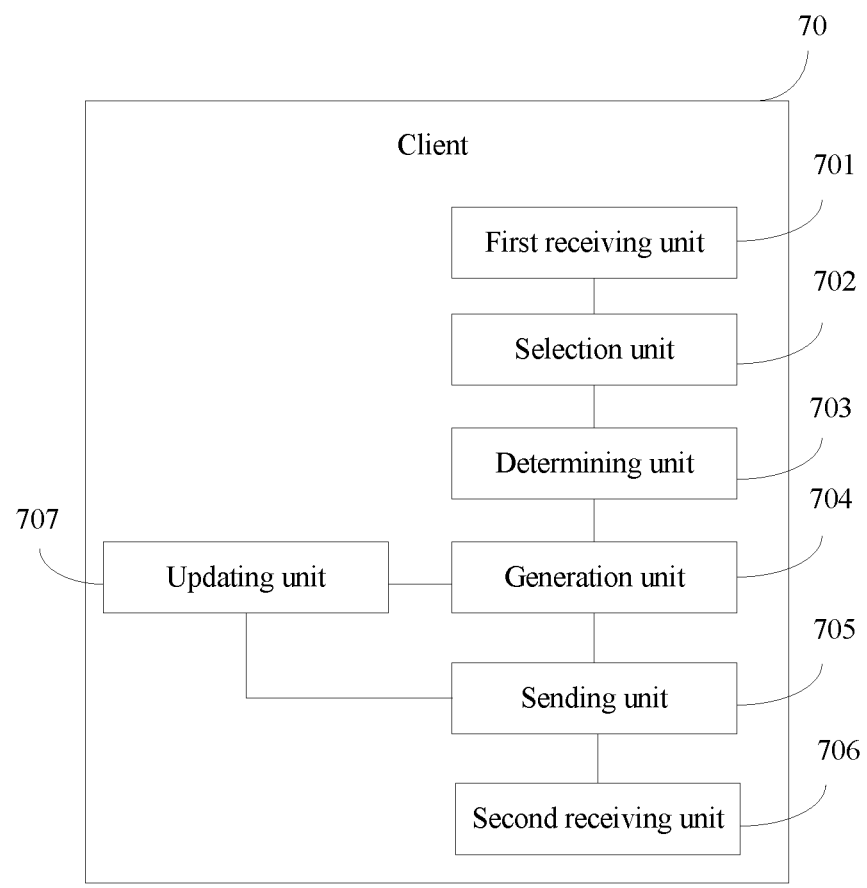
FIG. 12 is a schematic structural diagram of another client according to an embodiment of the present invention.

As shown in FIG. 12, the client 70 further includes:

a second receiving unit 706, configured to receive a request response data packet that is returned for the request data packet.

Optionally, a first request response data packet is selected, where the first request response data packet includes the content name, the content source identifier, a second expected distance, a second mobility status record, and content corresponding to the content name, where the second expected distance is a hop count distance for the request interest packet from the client to the first network node, the second mobility status record includes a second status record entry, and the second status record entry is used to record a mobility status of each network node that forwards the request response data packet to the client.

After the client receives the request response data packet forwarded by the at least one router, first, the client parses the request response data packet to obtain information of the expected distance and mobility status record; then, the client may select a request response data packet according to at least one of the expected distance, the mobility status record, and a selection rule, so that the client generates a request interest packet according to the request response data packet, where the selection rule may be a speed at which the router forwarding the request response data packet processes the request response data packet or a request response data packet that is first received by the client.

For example, when the client receives two request response data packets, the two request response data packets are respectively a first request response data packet and a second request response data packet, where the first request response data packet is a request response data packet first received by the client, and the second request response data packet is a request response data packet received after the client receives the first request response data packet, and both the first request response data packet and the second request response data packet are request response data packets in response to the request interest packet sent by the client to the content source.

If a second expected distance in the first request response data packet records that a hop count distance for the first request response data packet from the content source to the client is 3, and a second expected distance in the second request response data packet records that a hop count distance for the second request response data packet from the content source to the client is 4, the client may select a request response data packet with a shorter hop count distance according to the second expected distances, that is, may select the first request response data packet forwarded by fewer routers to generate a request interest packet.

If the hop count distance for the first request response data packet from the content source to the client, recorded in the second expected distance in the first request response data packet, is equal to the hop count distance for the second request response data packet from the content source to the client, recorded in the second expected distance in the second request response data packet, the client may check a mobility status of a network node that forwards the first request response data packet, recorded in a second mobility status record in the first request response data packet, and a mobility status of a network node that forwards the second request response data packet, recorded in a second mobility status record in the second request response data packet; if the mobility status of the network node that forwards the second request response data packet is more stable than the mobility status of the network node that forwards the first request response data packet, that is, a moving speed of the network node that forwards the second request response data packet may be low, and a moving speed of the network node that forwards the first request response data packet may be high, the client may select, according to the second mobility status records, the second request response data packet forwarded by the router that is more stable, to generate a request interest packet, where the network node may be the router or the content source.

If the hop count distance for the first request response data packet from the content source to the client, recorded in the second expected distance in the first request response data packet, is equal to the hop count distance for the second request response data packet from the content source to the client, recorded in the second expected distance in the second request response data packet, and the mobility status of the network node that forwards the first request response data packet, recorded in the second mobility status record in the first request response data packet, is the same as the mobility status of the network node that forwards the second request response data packet, recorded in the second mobility status record in the second request response data packet, the client may select, according to the selection rule, the first request response data packet forwarded by the router that processes the request response data packet faster, to generate a request interest packet.

When the selection rule is a request response data packet first received by the client, and when the client receives the request response data packet, the client selects the request response data packet to generate a request interest packet.

In an actual application, the request response data packet may be a first request response data packet, where the first request response data packet may be forwarded by fewest network nodes, and the network nodes are stable.

The client 70 further includes:

an updating unit 707, configured to update the revised value of the first expected distance to obtain an updated value if the request response data packet that is returned for the request data packet is not received in a first preset time period, where the request interest packet includes the first preset time period.

After the client sends the request interest packet to the at least one network node, when the request response data packet sent by the at least one network node is not received in the first preset time period, the client updates the revised value of the first expected distance to obtain the updated value, where the request interest packet includes the first preset time period.

Exemplarily, updating the revised value of the first expected distance to obtain the updated value may be adding 1 to the revised value of the first expected distance. Assuming that the revised value of the first expected distance is 3, 1 may be added to the revised value of the first expected distance, and the updated value obtained by updating the revised value of the first expected distance is 4.

The sending unit 705 is further configured to:

repeatedly send the updated request interest packet to the at least one network node, where the updated request interest packet includes the updated value.

Figure 13:
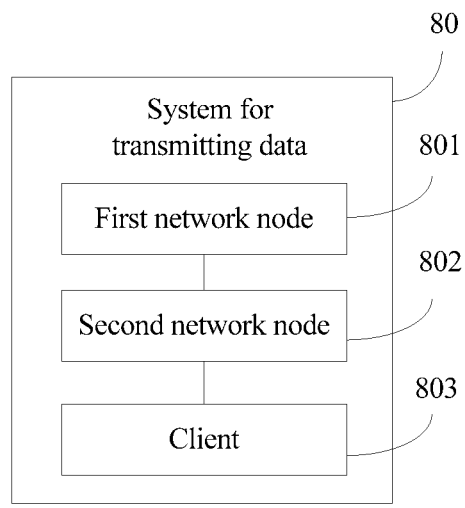
FIG. 13 is a schematic diagram of a system for transmitting data according to an embodiment of the present invention.

An embodiment of the present invention provides a system 80 for transmitting data. As shown in FIG. 13, the system includes:

at least one first network node 801, at least one second network node 802, and a client 803, where the second network node 802 and the client 803 exchange messages in a wireless manner, the first network node 801 may be a router or a content source, and the second network node 802 may be a router.

The client 803 is configured to: receive a detection response data packet that is returned by at least one network node for a detection interest packet sent by the client; select a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client; determine a revised value of the first expected distance according to the first status record entry and the first expected distance; generate a request interest packet, where the request interest packet includes the content name, the content source identifier, the revised value of the first expected distance, and a hop count, where the hop count is used to indicate a quantity of times that the request interest packet is forwarded; and send the request interest packet to the at least one network node.

The second network node 802 is configured to: receive a detection response data packet that is returned by the first network node for the detection interest packet sent by the client, where the detection response data packet includes the content name, the content source identifier, a first expected distance, and a first mobility status record, where the first expected distance is the hop count distance for the detection interest packet from the client to the first network node, the first mobility status record includes a first status record entry, and the first status record entry is used to record a mobility status of each network node that forwards the detection response data packet to the client; add a mobility status of the second network node to the first status record entry; forward the detection response data packet to the client; receive the request interest packet that is sent by the client according to the detection response data packet, where the request interest packet includes the content name, the content source identifier, the revised value of the first expected distance, and the hop count, where the hop count is used to indicate the quantity of times that the request interest packet is forwarded, and the revised value of the first expected distance is determined by the client according to the first status record entry and the first expected distance in the detection response data packet; and forward the request interest packet to the first network node according to the revised value of the first expected distance and the hop count.

The first network node 801 is configured to: receive the detection interest packet sent by the second network node, where the detection interest packet includes the content name; generate the detection response data packet according to the content name, where the detection response data packet includes the content name, the content source identifier, the first expected distance, and the first mobility status record, where the first expected distance is the hop count distance for the detection interest packet from the client to the first network node, and the first mobility status record includes the first status record entry, where the first status record entry is used to record the mobility status of each network node that forwards the detection response data packet to the client; add a mobility status of the first network node to the first status record entry; send the detection response data packet to the second network node, so that each network node that forwards the detection response data packet to the client adds the mobility status of the network node to the first status record entry and sends the detection response data packet to the client; and receive the request interest packet sent by the second network node, where the request interest packet includes the content name, the content source identifier, and the revised value of the first expected distance, where the revised value of the first expected distance is determined by the client according to the first status record entry and the first expected distance in the detection response data packet.

Figure 14:
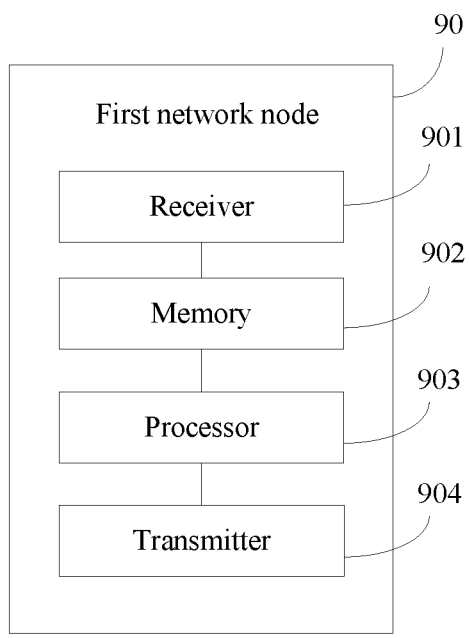
FIG. 14 is a schematic structural diagram of still another first network node according to an embodiment of the present invention.

An embodiment of the present invention provides a first network node 90, as shown in FIG. 14, including a receiver 901, a memory 902, a processor 903, and a transmitter 904.

The receiver 901 is configured to receive a detection interest packet sent by a second network node, where the detection interest packet includes a content name.

The detection interest packet further includes a hop count, where the hop count is set to 0, and the hop count is used to indicate a quantity of times that the detection interest packet is forwarded. When the detection interest packet is forwarded once, 1 is added to the current hop count. Exemplarily, when the detection interest packet is sent from a client to a first router, 1 is added to the hop count; when the detection interest packet is forwarded by the first router to a second router, 1 is added to the hop count again.

The memory 902 is configured to store program code.

The processor 903 is configured to invoke the program code stored in the memory 902 to execute the following method: generating a detection response data packet according to the content name, where the detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

The detection response data packet may be generated according to the hop count of the detection interest packet.

Particularly, the detection response data packet may further include content corresponding to the content name.

The method executed by the processor 903 further includes:

adding a mobility status of the first network node to the first status record entry.

The first status record entry includes a mobility status of at least one network node, where the mobility status includes a moving speed of the network node and a moving direction of the network node.

The transmitter 904 is configured to send the detection response data packet to the second network node, so that each network node that forwards the detection response data packet to the client adds the mobility status of the network node to the first status record entry and sends the detection response data packet to the client.

The receiver 901 is further configured to:

receive the request interest packet sent by the second network node, where the request interest packet includes the content name, the content source identifier, and a revised value of the first expected distance, where the revised value of the first expected distance is determined by the client according to the first status record entry and the first expected distance in the detection response data packet.

In this way, in a detection response data packet in response to a detection interest packet, a mobility status of a network node is recorded, so that a client determines a revised value of an expected distance according to the mobility status of the network node and the expected distance that are recorded in the detection response data packet and generates a request interest packet, so that the network node receives the request interest packet. Therefore, a problem that a success rate of request interest packet reception by a content source or a router is low is effectively solved.

It should be noted that, the receiver may further receive the request interest packet repeatedly sent by the second network node or the client, where the request interest packet includes an updated value, where the updated value is an updated value of the revised value of the first expected distance that is updated by the client; or receive the request interest packet repeatedly sent by the second network node, where the request interest packet includes an updated value, where the updated value is an updated value of the revised value of the first expected distance that is updated by the second network node.

The method executed by the processor 903 further includes:

generating a request response data packet, where the request response data packet includes a second expected distance, a second mobility status record, and the content corresponding to the content name, where the second expected distance is a hop count distance for the request interest packet from the client to the first network node, the second mobility status record includes a second status record entry, and the second status record entry is used to record a mobility status of each network node that forwards the request response data packet to the client.

The first network node receives the request interest packet sent by the second network node, and parses the request interest packet to obtain the content source identifier and the revised value of the first expected distance. When the content source identifier is the same as an identifier of the first network node, the first network node generates a request response data packet.

The method executed by the processor 903 further includes:

adding a mobility status of the first network node to the second status record entry.

The first network node adds the mobility status of the first network node to the second status record entry according to validity of the second mobility status record. It should be noted that, if the second mobility status record is invalid, the first network node does not need to add the mobility status of the first network node to the second status record entry.

The transmitter 904 is further configured to:

send the request response data packet to the second network node, so that each network node that forwards the request response data packet to the client adds the mobility status of the network node to the second status record entry and sends the request response data packet to the client.

Figure 15:
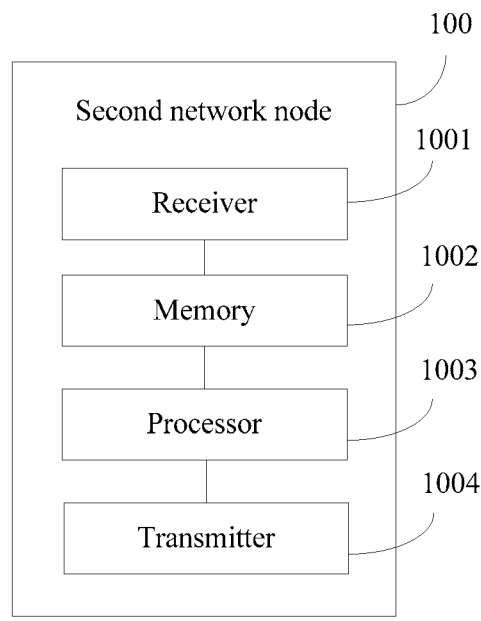
FIG. 15 is a schematic structural diagram of still another second network node according to an embodiment of the present invention.

An embodiment of the present invention provides a second network node 100, as shown in FIG. 15, including a receiver low, a memory 1002, a processor 1003, and a transmitter 1004.

The receiver 1001 is configured to receive a detection response data packet that is returned by a first network node for a detection interest packet sent by a client, where the detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the detection response data packet to the client.

The first status record entry includes a mobility status of at least one network node, where the mobility status includes a moving speed of the network node and a moving direction of the network node.

It should be noted that, before receiving the detection response data packet that is returned by the first network node for the detection interest packet sent by the client, the second network node receives the detection interest packet broadcast by the client to at least one first network node, and queries whether a content store table stores a response data packet for content corresponding to the content name; if the content store table does not store the response data packet for the content corresponding to the content name, the second network node queries whether a response table stores the content source identifier of the content corresponding to the content name; if the response table stores the content source identifier of the content corresponding to the content name, the second network node queries the first network node closest to the second network node in a distance table; then a PIT of the second network node records the detection interest packet; the second network node forwards the detection interest packet to the first network node, where 1 is added to the hop count of the detection interest packet. The distance table stores a distance between the second network node and the closest first network node, where the distance is a hop count distance from the second network node to the closet first network node. The second network node may first forward the detection interest packet to other second network nodes, and the other second network nodes forward the detection interest packet to the first network node, or the second network node directly forwards the detection interest packet to the first network node.

It should be noted that, if the response table does not store the content source identifier of the content corresponding to the content name, the second network node continues to broadcast the detection interest packet, and when the detection interest packet reaches a maximum hop count, discards the detection interest packet.

The memory 1002 is configured to store program code.

The processor 1003 is configured to invoke the program code stored in the memory 1002 to execute the following method: adding a mobility status of the second network node to the first status record entry.

The transmitter 1004 is configured to forward the detection response data packet to the client.

The receiver 1001 is further configured to:

receive the request interest packet that is sent by the client according to the detection response data packet, where the request interest packet includes the content name, the content source identifier, a revised value of the first expected distance, and a hop count, where the hop count is used to indicate a quantity of times that the request interest packet is forwarded, and the revised value of the first expected distance is determined by the client according to the first status record entry and the first expected distance in the detection response data packet.

It should be noted that, the receiver may further receive the request interest packet repeatedly sent by the client, where the request interest packet includes an updated value, where the updated value is an updated value of the updated revised value of the first expected distance.

The transmitter 1004 is further configured to:

forward the request interest packet to the first network node according to the revised value of the first expected distance and the hop count.

The second network node receives the request interest packet sent by the client, where 1 is added to the hop count. The second network node queries whether the content store table (CS) stores the response data packet for the content corresponding to the content name. If the content store table does not store the response data packet for the content corresponding to the content name, the second network node queries whether the pending interest table (PIT) records the request interest packet. If the pending interest table (PIT) does not record the request interest packet, the second network node queries whether the response table stores a first network node identifier of the content corresponding to the content name. If the response table stores the first network node identifier of the content corresponding to the content name, the second network node queries the first network node closest to the second network node in the distance table, and forwards the request interest packet to the first network node according to the revised value of the first expected distance and the hop count. The request interest packet includes the content name, the first network node identifier, the revised value of the first expected distance, and the hop count, where the hop count is used to indicate the quantity of times that the request interest packet is forwarded. Particularly, if the pending interest table (PIT) records the request interest packet, the second network node discards the request interest packet.

The transmitter 1004 is specifically configured to:

if a sum of the hop count in the request interest packet and a hop count distance from the second network node to the first network node is less than or equal to the revised value of the first expected distance, forward the request interest packet to the first network node; or if a sum of the hop count in the request interest packet and a hop count distance from the second network node to the first network node is greater than the revised value of the first expected distance, forward the request interest packet to the first network node after a delay of a preset duration; where the forwarding after a delay of a preset duration means that a preset duration is added additionally before the router forwards the request interest packet, that is, the router waits for an additional period of time before forwarding the request interest packet.

It should be noted that, the revised value of the first expected distance is a total hop count for the request interest packet from the client to the first network node, where the hop count is the quantity of times that the request interest packet is forwarded. The distance table stores a distance between the second network node and the first network node, where the distance is a hop count distance from the second network node to the first network node. When a sum of the hop count in the request interest packet and the hop count distance stored in the distance table from the second network node to the first network node is less than or equal to the revised value of the first expected distance, the second network node forwards the request interest packet. When a sum of the hop count in the request interest packet and the hop count distance stored in the distance table from the second network node to the first network node is greater than the revised value of the first expected distance, the second network node forwards the request interest packet after a delay, or discards the request interest packet.

In this way, a second network node adds a mobility status of the second network node to a status record entry in a first mobility status record, so that a client determines a revised value of an expected distance according to the mobility status of the network node and the expected distance that are recorded in a detection response data packet and generates a request interest packet, so that the network node receives the request interest packet. Therefore, a problem that a success rate of request interest packet reception by a content source or a router is low is effectively solved.

The receiver 1001 is further configured to:

receive the request response data packet sent by the first network node, where the request response data packet includes a second expected distance, a second mobility status record, and the content corresponding to the content name, where the second expected distance is a hop count distance for the request interest packet from the client to the first network node, the second mobility status record includes a second status record entry, and the second status record entry is used to record a mobility status of each network node that forwards the request response data packet to the client.

The second status record entry includes a mobility status of the at least one network node, where the mobility status includes a moving speed of the network node and a moving direction of the network node, and the network node may be the second network node or the first network node.

The method executed by the processor 1003 further includes:

adding a mobility status of the second network node to the second status record entry.

The second network node adds the mobility status of the second network node to the second status record entry according to validity of the second mobility status record. It should be noted that, if the second mobility status record is invalid, the second network node does not need to add the mobility status of the second network node to the second status record entry.

The transmitter 1004 is further configured to:

forward the request response data packet to the client.

The method executed by the processor 1003 further includes:

if the request response data packet sent by the first network node is not received in a first preset time period, updating the revised value of the first expected distance to obtain an updated value, where the request interest packet includes the first preset time period.

The transmitter 1004 is further configured to:

forward the request interest packet to the first network node according to the updated value and the hop count, where the request interest packet includes the updated value.

The second network node receives the request interest packet sent by the client, where the request interest packet includes the revised value of the first expected distance and the hop count. After the second network node forwards the request interest packet to the first network node according to the revised value of the first expected distance and the hop count, when the request response data packet sent by the first network node is not received in the second preset time period, the second network node updates the revised value of the first expected distance to obtain the updated value, where the request interest packet includes the second preset time period. It should be noted that, when other second network nodes between the second network node and the first network node are faulty, the second network node may update the revised value of the first expected distance to obtain the updated value.

Figure 16:
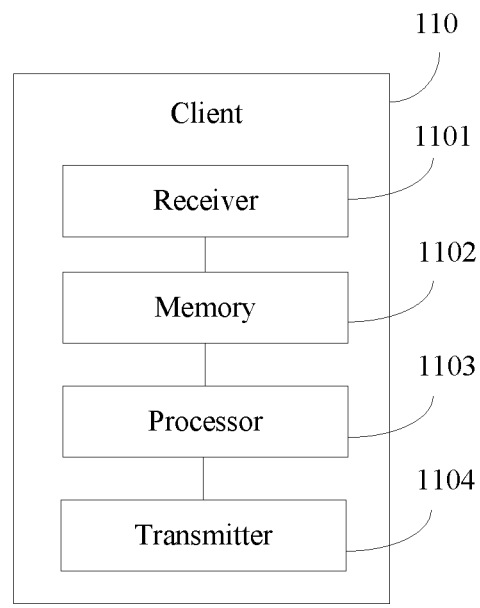
FIG. 16 is a schematic structural diagram of still another client according to an embodiment of the present invention.

An embodiment of the present invention provides a client 110, as shown in FIG. 16, including a receiver 1101, a memory 1102, a processor 1103, and a transmitter 1104.

The receiver 1101 is configured to receive a detection response data packet that is returned by at least one network node for a detection interest packet sent by the client.

Before receiving the detection response data packet that is returned by the at least one network node for the detection interest packet sent by the client, the client sends the detection interest packet to the at least one network node, where the detection interest packet includes a content name.

The memory 1102 is configured to store program code.

The processor 1103 is configured to invoke the program code stored in the memory to execute the following method:

selecting a first detection response data packet from the received detection response data packets, where the first detection response data packet includes the content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client.

The mobility status in the status record entry includes a moving speed and a moving direction of the network node.

After the client receives the detection response data packet forwarded by at least one router, first, the client parses the detection response data packet to obtain information of the first expected distance and first mobility status record; then, the client may select a detection response data packet according to at least one of the first expected distance, the first mobility status record, and a selection rule, so that the client generates a request interest packet according to the detection response data packet, where the selection rule may be a speed at which the router forwarding the detection response data packet processes the detection response data packet or a detection response data packet that is first received by the client.

For example, when the client receives two detection response data packets, the two detection response data packets are respectively a first detection response data packet and a second detection response data packet, where the first detection response data packet is a detection response data packet first received by the client, and the second detection response data packet is a detection response data packet received after the client receives the first detection response data packet, and both the first detection response data packet and the second detection response data packet are detection response data packets in response to the detection interest packet sent by the client to a content source.

If a first expected distance in the first detection response data packet records that a hop count distance for the first detection response data packet from the content source to the client is 3, and a first expected distance in the second detection response data packet records that a hop count distance for the second detection response data packet from the content source to the client is 4, the client may select a detection response data packet with a shorter hop count distance according to the first expected distances, that is, may select the first detection response data packet forwarded by fewer routers to generate a request interest packet.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, the client may check a mobility status of a network node that forwards the first detection response data packet, recorded in a first mobility status record in the first detection response data packet, and a mobility status of a network node that forwards the second detection response data packet, recorded in a first mobility status record in the second detection response data packet; if the mobility status of the network node that forwards the second detection response data packet is more stable than the mobility status of the network node that forwards the first detection response data packet, that is, a moving speed of the network node that forwards the second detection response data packet may be low, and a moving speed of the network node that forwards the first detection response data packet may be high, the client may select, according to the first mobility status records, the second detection response data packet forwarded by the router that is more stable, to generate a request interest packet, where the network node may be the router or the content source.

If the hop count distance for the first detection response data packet from the content source to the client, recorded in the first expected distance in the first detection response data packet, is equal to the hop count distance for the second detection response data packet from the content source to the client, recorded in the first expected distance in the second detection response data packet, and the mobility status of the network node that forwards the first detection response data packet, recorded in the first mobility status record in the first detection response data packet, is the same as the mobility status of the network node that forwards the second detection response data packet, recorded in the first mobility status record in the second detection response data packet, the client may select, according to the selection rule, the first detection response data packet forwarded by the router that processes the detection response data packet faster, to generate a request interest packet.

When the selection rule is a detection response data packet first received by the client, and when the client receives the detection response data packet, the client selects the detection response data packet to generate a request interest packet.

In an actual application, the detection response data packet may be a first detection response data packet, where the first detection response data packet may be a detection response data packet forwarded by fewest network nodes, and the network nodes are stable.

The method executed by the processor 1103 further includes:

determining a revised value of the first expected distance according to the first status record entry and the first expected distance, where the first status record entry includes a mobility status of the at least one network node, and the mobility status includes a moving speed of the network node and a moving direction of the network node; and generating a request interest packet, where the request interest packet includes the content name, the content source identifier, the revised value of the first expected distance, and a hop count, where the hop count is used to indicate a quantity of times that the request interest packet is forwarded.

The transmitter 1104 is configured to send the request interest packet to the at least one network node.

In this way, a client determines a revised value of an expected distance according to a mobility status of a network node and the expected distance that are recorded in a detection response data packet and generates a request interest packet, so that the network node receives the request interest packet. Therefore, a problem that a success rate of request interest packet reception by a content source or a router is low is effectively solved.

The method executed by the processor 1103 includes:

determining the revised value of the first expected distance according to the first expected distance and the mobility status of the network node that forwards the first detection response data packet, where the revised value of the first expected distance is greater than, less than, or equal to the first expected distance.

The method executed by the processor 1103 includes:

parsing the received detection response data packets, and selecting the first detection response data packet according to first expected distances and first mobility status records in the detection response data packets and according to a selection rule.

The receiver 1101 is further configured to:

receive a request response data packet that is returned for the request data packet.

Optionally, a first request response data packet is selected, where the first request response data packet includes the content name, the content source identifier, a second expected distance, a second mobility status record, and content corresponding to the content name, where the second expected distance is a hop count distance for the request interest packet from the client to the first network node, and the second mobility status record includes a status flag bit and a status record entry, where the status flag bit is used to indicate validity of the second mobility status record, and the status record entry is used to record a mobility status of each network node that forwards the first request response data packet to the client.

After the client receives the request response data packet forwarded by the at least one router, first, the client parses the request response data packet to obtain information of the second expected distance and second mobility status record; then, the client may select a request response data packet according to at least one of the second expected distance, the second mobility status record, and a selection rule, so that the client generates a request interest packet according to the request response data packet, where the selection rule may be a speed at which the router forwarding the request response data packet processes the request response data packet or a request response data packet that is first received by the client.

For example, when the client receives two request response data packets, the two request response data packets are respectively a first request response data packet and a second request response data packet, where the first request response data packet is a request response data packet first received by the client, and the second request response data packet is a request response data packet received after the client receives the first request response data packet, and both the first request response data packet and the second request response data packet are request response data packets in response to the request interest packet sent by the client to the content source.

If a second expected distance in the first request response data packet records that a hop count distance for the first request response data packet from the content source to the client is 3, and a second expected distance in the second request response data packet records that a hop count distance for the second request response data packet from the content source to the client is 4, the client may select a request response data packet with a shorter hop count distance according to the second expected distances, that is, may select the first request response data packet forwarded by fewer routers to generate a request interest packet.

If the hop count distance for the first request response data packet from the content source to the client, recorded in the second expected distance in the first request response data packet, is equal to the hop count distance for the second request response data packet from the content source to the client, recorded in the second expected distance in the second request response data packet, the client may check a mobility status of a network node that forwards the first request response data packet, recorded in a second mobility status record in the first request response data packet, and a mobility status of a network node that forwards the second request response data packet, recorded in a second mobility status record in the second request response data packet; if the mobility status of the network node that forwards the second request response data packet is more stable than the mobility status of the network node that forwards the first request response data packet, that is, a moving speed of the network node that forwards the second request response data packet may be low, and a moving speed of the network node that forwards the first request response data packet may be high, the client may select, according to the second mobility status records, the second request response data packet forwarded by the router that is more stable, to generate a request interest packet, where the network node may be the router or the content source.

If the hop count distance for the first request response data packet from the content source to the client, recorded in the second expected distance in the first request response data packet, is equal to the hop count distance for the second request response data packet from the content source to the client, recorded in the second expected distance in the second request response data packet, and the mobility status of the network node that forwards the first request response data packet, recorded in the second mobility status record in the first request response data packet, is the same as the mobility status of the network node that forwards the second request response data packet, recorded in the second mobility status record in the second request response data packet, the client may select, according to the selection rule, the first request response data packet forwarded by the router that processes the request response data packet faster, to generate a request interest packet.

When the selection rule is a request response data packet first received by the client, and when the client receives the request response data packet, the client selects the request response data packet to generate a request interest packet.

In an actual application, the request response data packet may be a first request response data packet, where the first request response data packet may be forwarded by fewest network nodes, and the network nodes are stable.

The method executed by the processor 1103 further includes:

if the request response data packet sent by the at least one network node is not received in a first preset time period, updating the revised value of the first expected distance to obtain an updated value, where the request interest packet includes the first preset time period.

After the client sends the request interest packet to the at least one network node, when the request response data packet sent by the at least one network node is not received in the first preset time period, the client updates the revised value of the first expected distance to obtain the updated value, where the request interest packet includes the first preset time period.

Exemplarily, updating the revised value of the first expected distance to obtain the updated value may be adding 1 to the revised value of the first expected distance. Assuming that the revised value of the first expected distance is 3, 1 may be added to the revised value of the first expected distance, and the updated value obtained by updating the revised value of the first expected distance is 4.

The transmitter 1104 is further configured to:

repeatedly send the updated request interest packet to the at least one network node, where the updated request interest packet includes the updated value.

Figure 17:
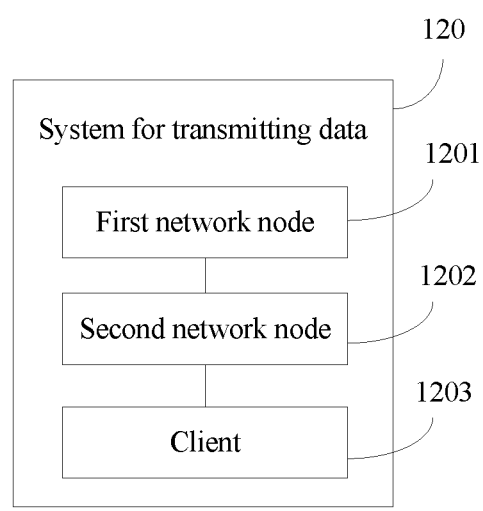
FIG. 17 is a schematic diagram of another system for transmitting data according to an embodiment of the present invention.

An embodiment of the present invention provides a system 120 for transmitting data. As shown in FIG. 17, the system includes:

at least one first network node 1201, at least one second network node 1202, and at least one client 1203, where the first network node 1201, the second network node 1202, and the client 1203 exchange messages in a wireless manner, the first network node 1201 may be a content source or a router, and the second network node 1202 may be a router.

The client 1203 is configured to: receive a detection response data packet that is returned by at least one network node for a detection interest packet sent by the client; select a first detection response data packet from the received detection response data packets, where the first detection response data packet includes a content name, a content source identifier, a first expected distance, and a first mobility status record, where the first expected distance is a hop count distance for the detection interest packet from the client to the first network node, the first mobility status record includes a first status record entry, and the first status record entry is used to record a mobility status of each network node that forwards the first detection response data packet to the client; determine a revised value of the first expected distance according to the first status record entry and the first expected distance; generate a request interest packet, where the request interest packet includes the content name, the content source identifier, the revised value of the first expected distance, and a hop count, where the hop count is used to indicate a quantity of times that the request interest packet is forwarded; and send the request interest packet to the at least one network node.

The second network node 1202 is configured to: receive a detection response data packet that is returned by the first network node for the detection interest packet sent by the client, where the detection response data packet includes the content name, the content source identifier, a first expected distance, and a first mobility status record, where the first expected distance is the hop count distance for the detection interest packet from the client to the first network node, the first mobility status record includes a first status record entry, and the first status record entry is used to record a mobility status of each network node that forwards the detection response data packet to the client; add a mobility status of the second network node to the first status record entry; forward the detection response data packet to the client; receive the request interest packet that is sent by the client according to the detection response data packet, where the request interest packet includes the content name, the content source identifier, the revised value of the first expected distance, and the hop count, where the hop count is used to indicate the quantity of times that the request interest packet is forwarded, and the revised value of the first expected distance is determined by the client according to the first status record entry and the first expected distance in the detection response data packet; and forward the request interest packet to the first network node according to the revised value of the first expected distance and the hop count.

The first network node 1201 is configured to: receive the detection interest packet sent by the second network node, where the detection interest packet includes the content name; generate the detection response data packet according to the content name, where the detection response data packet includes the content name, the content source identifier, the first expected distance, and the first mobility status record, where the first expected distance is the hop count distance for the detection interest packet from the client to the first network node, and the first mobility status record includes the first status record entry, where the first status record entry is used to record the mobility status of each network node that forwards the detection response data packet to the client; add a mobility status of the first network node to the first status record entry; send the detection response data packet to the second network node, so that each network node that forwards the detection response data packet to the client adds the mobility status of the network node to the first status record entry and sends the detection response data packet to the client; and receive the request interest packet sent by the second network node, where the request interest packet includes the content name, the content source identifier, and the revised value of the first expected distance, where the revised value of the first expected distance is determined by the client according to the first status record entry and the first expected distance in the detection response data packet.

In the system for transmitting data according to the embodiment of the present invention, first, a client sends a detection interest packet to a content source through a router; the content source generates a detection response data packet according to a content name included in the detection interest packet, adds a mobility status of the content source to a status record entry, and then sends the detection response data packet to the router; the router adds a mobility status of the router to the first status record entry, and forwards the detection response data packet to the client; then, the client selects a first detection response data packet, determines a revised value of a first expected distance according to the first status record entry and the first expected distance, generates a request interest packet, and sends the request interest packet to the router; the router forwards the request interest packet to the content source according to the revised value of the first expected distance and a hop count; the content source generates a request response data packet, adds a mobility status of the content source to a second status record entry, and then sends the request response data packet to the router; the router adds a mobility status of the router to the second status record entry, and forwards the request response data packet to the client; the client may select a first request response data packet. In comparison with the prior art, a mobility status record is set in a response data packet, a mobility status of a network node is added to a status record entry in the mobility status record, and the response data packet is sent to a client, so that the client determines a revised value of an expected distance according to the status record entry, generates a request interest packet, and sends the request interest packet to at least one network node, so that the network node receives the request interest packet. Therefore, a problem of heavy network load, a long transmission delay, and a low success rate due to inadaptability of conventional routing and forwarding to moving of a network node is solved effectively, and a success rate of request interest packet reception by a content source or a router is improved effectively. In addition, unnecessary path broadcast is reduced, network load is reduced, and energy of the network node is saved.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data, the method comprising:
receiving, at a first network node, a detection interest packet sent by a second network node, wherein the detection interest packet comprises a content name;
generating, at the first network node, a detection response data packet according to the content name, wherein the detection response data packet comprises the content name, a content source identifier, a first expected distance, and a first mobility status record, wherein the first expected distance is a hop count distance for the detection interest packet from a client to the first network node, and wherein the first mobility status record comprises a first status record entry, the first status record entry being used to record a mobility status of each network node that forwards the detection response data packet to the client;
adding, at the first network node, a mobility status of the first network node to the first status record entry;
sending, from the first network node, the detection response data packet to the second network node so that each network node that forwards the detection response data packet to the client adds the mobility status of the network node to the first status record entry and sends the detection response data packet to the client; and
receiving, at the first network node, a request interest packet sent by the second network node, wherein the request interest packet comprises the content name, the content source identifier, and a revised value of the first expected distance, and wherein the revised value of the first expected distance is determined by the client according to the first status record entry and the first expected distance in the detection response data packet.

2. The method according to claim 1, further comprising, after receiving the request interest packet sent by the second network node:
generating a request response data packet, wherein the request response data packet comprises a second expected distance, a second mobility status record, and content corresponding to the content name, wherein the second expected distance is a hop count distance for the request interest packet from the client to the first network node, and wherein the second mobility status record comprises a second status record entry, the second status record entry being used to record a mobility status of each network node that forwards the request response data packet to the client;
adding a mobility status of the first network node to the second status record entry; and
sending the request response data packet to the second network node so that each network node that forwards the request response data packet to the client adds the mobility status of the network node to the second status record entry and sends the request response data packet to the client.

3. The method according to claim 1, wherein the mobility status comprises a moving speed and a moving direction of the network node.

4. A method for transmitting data, the method comprising:
receiving, at a second network node, a detection response data packet that is returned by a first network node for a detection interest packet sent by a client, wherein the detection response data packet comprises a content name, a content source identifier, a first expected distance, and a first mobility status record, wherein the first expected distance is a hop count distance for the detection interest packet from the client to the first network node, and wherein the first mobility status record comprises a first status record entry, and the first status record entry is used to record a mobility status of each network node that forwards the detection response data packet to the client;
adding, at a second network node, a mobility status of the second network node to the first status record entry;
forwarding, at a second network node, the detection response data packet to the client;
receiving, at a second network node, a request interest packet that is sent by the client according to the detection response data packet, wherein the request interest packet comprises the content name, the content source identifier, a revised value of the first expected distance, and a hop count, wherein the hop count is used to indicate a quantity of times that the request interest packet is forwarded, and wherein the revised value of the first expected distance is determined by the client according to the first status record entry and the first expected distance in the detection response data packet; and
forwarding, at a second network node, the request interest packet to the first network node according to the revised value of the first expected distance and the hop count.

5. The method according to claim 4, wherein forwarding the request interest packet to the first network node according to the revised value of the first expected distance and the hop count comprises:
if a sum of the hop count in the request interest packet and a hop count distance from the second network node to the first network node is less than or equal to the revised value of the first expected distance, forwarding the request interest packet to the first network node; or
if a sum of the hop count in the request interest packet and a hop count distance from the second network node to the first network node is greater than the revised value of the first expected distance, forwarding the request interest packet to the first network node after a delay of a preset duration.

6. The method according to claim 4, further comprising, after forwarding the request interest packet to the first network node according to the revised value of the first expected distance and the hop count:
- receiving the request response data packet sent by the first network node, wherein the request response data packet comprises a second expected distance, a second mobility status record, and content corresponding to the content name, wherein the second expected distance is a hop count distance for the request interest packet from the client to the first network node, the second mobility status record comprises a second status record entry, and wherein the second status record entry is used to record a mobility status of each network node that forwards the request response data packet to the client;
- adding a mobility status of the second network node to the second status record entry; and
- forwarding the request response data packet to the client.

7. The method according to claim 4, further comprising, after forwarding the request interest packet to the first network node according to the revised value of the first expected distance and the hop count:
- if a request response data packet sent by the first network node is not received in a first preset time period, updating the revised value of the first expected distance to obtain an updated value, wherein the request interest packet comprises the first preset time period; and
- forwarding the request interest packet to the first network node according to the updated value and the hop count, wherein the request interest packet comprises the updated value.

8. The method according to claim 4, wherein the mobility status comprises a moving speed and a moving direction of the network node.

9. A method for transmitting data, the method comprising:
- receiving, at a client, a detection response data packet that is returned by at least one network node for a detection interest packet sent by the client;
- selecting, at the client, a first detection response data packet from the received detection response data packets, wherein the first detection response data packet comprises a content name, a content source identifier, a first expected distance, and a first mobility status record, wherein the first expected distance is a hop count distance for the detection interest packet from the client to a first network node, the first mobility status record comprises a first status record entry, and wherein the first status record entry is used to record a mobility status of each network node that forwards the first detection response data packet to the client;
- determining, at the client, a revised value of the first expected distance according to the first status record entry and the first expected distance;
- generating, at the client, a request interest packet, wherein the request interest packet comprises the content name, the content source identifier, the revised value of the first expected distance, and a hop count, and wherein the hop count is used to indicate a quantity of times that the request interest packet is forwarded; and
- sending, from the client, the request interest packet to the at least one network node.

10. The method according to claim 9, wherein determining the revised value of the first expected distance according to the first status record entry and the first expected distance comprises:
- determining the revised value of the first expected distance according to the first expected distance and the mobility status of the network node that forwards the first detection response data packet, wherein the revised value of the first expected distance is greater than, less than, or equal to the first expected distance.

11. The method according to claim 9, wherein selecting the first detection response data packet from the received detection response data packets comprises:
- parsing the received detection response data packets, and selecting the first detection response data packet according to first expected distances and first mobility status records in the detection response data packets and according to a selection rule.

12. The method according to claim 11, further comprising, after sending the request interest packet to the at least one network node, receiving a request response data packet that is returned for the request data packet.

13. The method according to claim 9, further comprising, after the sending the request interest packet to the at least one network node:
- if a request response data packet that is returned for the request data packet is not received in a first preset time period, updating the revised value of the first expected distance to obtain an updated value, wherein the request interest packet comprises the first preset time period; and
- repeatedly sending the updated request interest packet to the at least one network node, wherein the updated request interest packet comprises the updated value.

14. The method according to claim 9, wherein the mobility status comprises a moving speed and a moving direction of the network node.

15. A first network node comprising:
- a first receiving unit configured to receive a detection interest packet sent by a second network node, wherein the detection interest packet comprises a content name;
- a first generation unit configured to generate a detection response data packet according to the content name, wherein the detection response data packet comprises the content name, a content source identifier, a first expected distance, and a first mobility status record, wherein the first expected distance is a hop count distance for the detection interest packet from a client to the first network node, wherein the first mobility status record comprises a first status record entry, and wherein the first status record entry is used to record a mobility status of each network node that forwards the detection response data packet to the client;
- a first adding unit configured to add a mobility status of the first network node to the first status record entry;
- a first sending unit configured to send the detection response data packet to the second network node so that each network node that forwards the detection response data packet to the client adds the mobility status of the network node to the first status record entry and sends the detection response data packet to the client; and
- a second receiving unit configured to receive a request interest packet sent by the second network node, wherein the request interest packet comprises the content name, the content source identifier, and a revised value of the first expected distance, wherein the revised value of the first expected distance is determined by the client according to the first status record entry and the first expected distance in the detection response data packet.

16. The first network node according to claim 15, wherein the first network node further comprises:
- a second generation unit configured to generate a request response data packet, wherein the request response data packet comprises a second expected distance, a second mobility status record, and content corresponding to the content name, wherein the second expected distance is a hop count distance for the request interest packet from the client to the first network node, the second mobility status record comprises a second status record entry, and wherein the second status record entry is used to record a mobility status of each network node that forwards the request response data packet to the client;
- a second adding unit configured to add a mobility status of the first network node to the second status record entry; and
- a second sending unit configured to send the request response data packet to the second network node, so that each network node that forwards the request response data packet to the client adds the mobility status of the network node to the second status record entry and sends the request response data packet to the client.

17. The first network node according to claim 15, wherein the mobility status comprises a moving speed and a moving direction of the network node.

18. A second network node comprising:
- a first receiving unit configured to receive a detection response data packet that is returned by a first network node for a detection interest packet sent by a client, wherein the detection response data packet comprises a content name, a content source identifier, a first expected distance, and a first mobility status record, wherein the first expected distance is a hop count distance for the detection interest packet from the client to the first network node, wherein the first mobility status record comprises a first status record entry, and wherein the first status record entry is used to record a mobility status of each network node that forwards the detection response data packet to the client;
- a first adding unit configured to add a mobility status of the second network node to the first status record entry;
- a first forwarding unit configured to forward the detection response data packet to the client;
- a second receiving unit configured to receive the request interest packet that is sent by the client according to the detection response data packet, wherein the request interest packet comprises the content name, the content source identifier, a revised value of the first expected distance, and a hop count, wherein the hop count is used to indicate a quantity of times that the request interest packet is forwarded, the revised value of the first expected distance being determined by the client according to the first status record entry and the first expected distance in the detection response data packet; and
- a second forwarding unit configured to forward the request interest packet to the first network node according to the revised value of the first expected distance and the hop count.

19. The second network node according to claim 18, wherein the second forwarding unit is specifically configured to:
- if a sum of the hop count in the request interest packet and a hop count distance from the second network node to the first network node is less than or equal to the revised value of the first expected distance, forward the request interest packet to the first network node; or
- if a sum of the hop count in the request interest packet and a hop count distance from the second network node to the first network node is greater than the revised value of the first expected distance, forward the request interest packet to the first network node after a delay of a preset duration.

20. The second network node according to claim 18, wherein the second network node further comprises:
- a third receiving unit configured to receive the request response data packet sent by the first network node, wherein the request response data packet comprises a second expected distance, a second mobility status record, and content corresponding to the content name, wherein the second expected distance is a hop count distance for the request interest packet from the client to the first network node, wherein the second mobility status record comprises a second status record entry, and wherein the second status record entry is used to record a mobility status of each network node that forwards the request response data packet to the client;
- a second adding unit configured to add a mobility status of the second network node to the second status record entry; and
- a third forwarding unit configured to forward the request response data packet to the client.

* * * * *